US010486770B2

(12) United States Patent
Emura et al.

(10) Patent No.: US 10,486,770 B2
(45) Date of Patent: Nov. 26, 2019

(54) BICYCLE TENSIONER APPARATUS AND BICYCLE TENSIONER

(71) Applicant: SHIMANO INC., Sakai (JP)

(72) Inventors: Atsuhiro Emura, Sakai (JP); Toshinari Oishi, Sakai (JP); Yusuke Nishimoto, Sakai (JP); Sota Yamaguchi, Sakai (JP); Kohei Obuchi, Sakai (JP); Kento Mitsuyasu, Sakai (JP)

(73) Assignee: SHIMANO INC., Sakai (JP)

( * ) Notice: Subject to any disclaimer, the term of this patent is extended or adjusted under 35 U.S.C. 154(b) by 300 days.

(21) Appl. No.: 15/199,830

(22) Filed: Jun. 30, 2016

(65) Prior Publication Data

US 2018/0001961 A1 Jan. 4, 2018

(51) Int. Cl.
*B62M 9/16* (2006.01)
*F16H 7/20* (2006.01)
*F16H 7/12* (2006.01)
*F16H 7/08* (2006.01)
*B62M 9/00* (2006.01)

(52) U.S. Cl.
CPC ............. *B62M 9/16* (2013.01); *F16H 7/1281* (2013.01); *F16H 7/20* (2013.01); *B62M 2009/007* (2013.01); *F16H 2007/0865* (2013.01); *F16H 2007/0893* (2013.01)

(58) Field of Classification Search
CPC . B62M 9/16; B62M 2009/007; F16H 7/1281; F16H 7/20; F16H 2007/0865; F16H 2007/0895
See application file for complete search history.

(56) References Cited

U.S. PATENT DOCUMENTS 9,751,590 B2 * 9/2017 Shipman ................. B62M 9/126
2005/0217914 A1 * 10/2005 Sugimoto ............ B62K 25/005
 180/206.4
2014/0357436 A1 12/2014 Hara
2014/0357437 A1 12/2014 Hara

FOREIGN PATENT DOCUMENTS

| DE | 3238965 | 4/1984 |
| EP | 2562074 | 2/2013 |
| JP | 08-230757 | 9/1996 |
| JP | 3980716 B2 | 4/1999 |
| JP | 2005-75069 | 3/2005 |
| WO | WO 2005/021369 | 3/2005 |

* cited by examiner

*Primary Examiner* — Michael R Mansen
*Assistant Examiner* — Robert T Reese
(74) *Attorney, Agent, or Firm* — Mori & Ward, LLP

(57) ABSTRACT

A bicycle tensioner apparatus comprises a first base member, a second base member, and a tensioner. The second base member is movably coupled to the first base member. The tensioner is configured to contact a driving-force transmitting member to apply tension to the driving-force transmitting member. The tensioner is coupled to both the first base member and the second base member. The tensioner is movable relative to at least one of the first base member and the second base member in response to a relative movement between the first base member and the second base member.

33 Claims, 31 Drawing Sheets

FIG. 29

| | | SECOND TRANSMISSION MEMBER | | | | | | |
|---|---|---|---|---|---|---|---|---|
| | | CW27 | CW26 | CW25 | CW24 | CW23 | CW22 | CW21 |
| | | 41 | 37 | 33 | 29 | 25 | 21 | 19 |
| | 19 | 0.46 | 0.51 | 0.58 | 0.66 | 0.76 | 0.90 | 1.00 |
| | 21 | 0.51 | 0.57 | 0.64 | 0.72 | 0.84 | 1.00 | 1.11 |
| | 25 | 0.61 | 0.68 | 0.76 | 0.86 | 1.00 | 1.19 | 1.32 |
| | 29 | 0.71 | 0.78 | 0.88 | 1.00 | 1.16 | 1.38 | 1.53 |
| | 33 | 0.80 | 0.89 | 1.00 | 1.14 | 1.32 | 1.57 | 1.74 |
| | 37 | 0.90 | 1.00 | 1.12 | 1.28 | 1.48 | 1.76 | 1.95 |
| | 41 | 1.00 | 1.11 | 1.24 | 1.41 | 1.64 | 1.95 | 2.16 → RT1 |

| | CW11 | CW12 | CW13 | CW14 | CW15 | CW16 | CW17 |
|---|---|---|---|---|---|---|---|
| | 19 | 21 | 25 | 29 | 33 | 37 | 41 |
| FIRST TRANSMISSION MEMBER | | | | | | | |

| SHIFT POSITION | FIRST TRANSMISSION MEMBER | FIRST GUIDE MEMBER | FIRST COGWHEEL | SECOND COGWHEEL |
|---|---|---|---|---|
| 1 | P31 | P41 | CW11 | CW27 |
| 2 | P32 | P42 | CW11 | CW26 |
| 3 | P31 | P42 | CW12 | CW26 |
| 4 | P32 | P43 | CW12 | CW25 |
| 5 | P31 | P43 | CW13 | CW25 |
| 6 | P32 | P44 | CW13 | CW24 |
| 7 | P31 | P44 | CW14 | CW24 |
| 8 | P32 | P45 | CW14 | CW23 |
| 9 | P31 | P45 | CW15 | CW23 |
| 10 | P32 | P46 | CW15 | CW22 |
| 11 | P31 | P46 | CW16 | CW22 |
| 12 | P32 | P47 | CW16 | CW21 |
| 13 | P31 | P47 | CW17 | CW21 |

BICYCLE TENSIONER APPARATUS AND BICYCLE TENSIONER

BACKGROUND OF THE INVENTION

Field of the Invention

The present invention relates to a bicycle tensioner apparatus and a bicycle tensioner.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a tensioner.

SUMMARY OF THE INVENTION

In accordance with a first aspect of the present invention, a bicycle tensioner apparatus comprises a first base member, a second base member, and a tensioner. The second base member is movably coupled to the first base member. The tensioner is configured to contact a driving-force transmitting member to apply tension to the driving-force transmitting member. The tensioner is coupled to both the first base member and the second base member. The tensioner is movable relative to at least one of the first base member and the second base member in response to a relative movement between the first base member and the second base member.

With the bicycle tensioner apparatus according to the first aspect, it is possible to adjust the tension applied from the tensioner to the driving-force transmitting member in response to the relative movement between the first base member and the second base member.

In accordance with a second aspect of the present invention, the bicycle tensioner apparatus according to the first aspect is configured so that one of the first base member and the second base member includes one of a guide surface and a guide follower. The tensioner includes the other of the guide surface and the guide follower. The guide follower is disposed on the guide surface to move the tensioner relative to the one of the first base member and the second base member in response to the relative movement between the first base member and the second base member.

With the bicycle tensioner apparatus according to the second aspect, it is possible to adjust the tension applied from the tensioner to the driving-force transmitting member with a simple structure such as the guide surface and the guide follower.

In accordance with a third aspect of the present invention, the bicycle tensioner apparatus according to any one of the above aspects is configured so that the tensioner includes a support member and a first guide member. The support member is pivotally coupled to the second base member about a support pivot axis. The first guide member is mounted to the support member to guide the driving-force transmitting member.

With the bicycle tensioner apparatus according to the third aspect, it is possible to guide the driving-force transmitting member to adjust the tension by using the support member and the first guide member.

In accordance with a fourth aspect of the present invention, the bicycle tensioner apparatus according to any one of the above aspects is configured so that the tensioner includes a second guide member mounted to the support member to guide the driving-force transmitting member.

With the bicycle tensioner apparatus according to the fourth aspect, it is possible to stabilize the driving-force transmitting member relative to the second base member by using the first guide member and the second guide member.

In accordance with a fifth aspect of the present invention, the bicycle tensioner apparatus according to any one of the above aspects is configured so that the first guide member includes a first pulley rotatably coupled to the support member about a first rotational axis.

With the bicycle tensioner apparatus according to the fifth aspect, it is possible to smoothly guide the driving-force transmitting member such as a bicycle chain.

In accordance with a sixth aspect of the present invention, the bicycle tensioner apparatus according to any one of the above aspects is configured so that the tensioner includes a second guide member mounted to the support member to guide the driving-force transmitting member. The second guide member includes a second pulley rotatably coupled to the support member about a second rotational axis.

With the bicycle tensioner apparatus according to the sixth aspect, it is possible to more smoothly guide the driving-force transmitting member such as the bicycle chain.

In accordance with a seventh aspect of the present invention, the bicycle tensioner apparatus according to any one of the above aspects is configured so that the support pivot axis coincides with the second rotational axis.

With the bicycle tensioner apparatus according to the seventh aspect, it is possible to simplify the structure of the bicycle tensioner apparatus.

In accordance with an eighth aspect of the present invention, the bicycle tensioner apparatus according to any one of the above aspects is configured so that one of the guide surface and the guide follower is provided at the support member.

With the bicycle tensioner apparatus according to the eighth aspect, it is possible to move the first guide member relative to the first base member and the second base member by using the one of the guide surface and the guide follower of the support member.

In accordance with a ninth aspect of the present invention, the bicycle tensioner apparatus according to any one of the above aspects is configured so that the tensioner includes a biasing member to apply a biasing force to the support member to pivot the support member about the support pivot axis.

With the bicycle tensioner apparatus according to the ninth aspect, it is possible to stabilize the orientation of the support member relative to the first base member and the second base member.

In accordance with a tenth aspect of the present invention, the bicycle tensioner apparatus according to any one of the above aspects is configured so that the second base member is movable relative to the first base member between a first base position and a second base position. The tensioner is pivotable relative to the second base member about the support pivot axis between a first pivot position and a second pivot position. The guide follower is disposed on the guide surface to move the tensioner from the first pivot position to the second pivot position in response to a movement of the second base member from the first base position to the second base position.

With the bicycle tensioner apparatus according to the tenth aspect, it is possible to adjust the tension applied from the tensioner to the driving-force transmitting member by arranging the guide surface and the guide follower to adjust the first pivot position and the second pivot position.

In accordance with an eleventh aspect of the present invention, the bicycle tensioner apparatus according to any one of the above aspects is configured so that the guide surface includes a first guide part and a second guide part. The tensioner is positioned at the first pivot position in a state where the guide follower is disposed on the first guide part. The tensioner is positioned at the second pivot position in a state where the guide follower is disposed on the second guide part.

With the bicycle tensioner apparatus according to the eleventh aspect, it is possible to adjust the tension applied from the tensioner to the driving-force transmitting member by adjusting at least one of positions of the first guide part and the second guide part.

In accordance with a twelfth aspect of the present invention, the bicycle tensioner apparatus according to any one of the above aspects is configured so that the second base member is pivotally coupled to the first base member about a base pivot axis. A first distance defined between the base pivot axis and the first guide part is different from a second distance defined between the base pivot axis and the second guide part.

With the bicycle tensioner apparatus according to the twelfth aspect, it is possible to change the position of the tensioner in response to the relative movement between the first base member and the second base member.

In accordance with a thirteenth aspect of the present invention, the bicycle tensioner apparatus according to any one of the above aspects is configured so that the guide follower is in contact with the guide surface.

With the bicycle tensioner apparatus according to the thirteenth aspect, it is possible to receive a reaction force from the driving-force transmitting member with the guide surface.

In accordance with a fourteenth aspect of the present invention, the bicycle tensioner apparatus according to any one of the above aspects is configured so that the one of the first base member and the second base member includes a guide groove. The guide surface at least partly defines the guide groove. The guide follower is disposed in the guide groove.

With the bicycle tensioner apparatus according to the fourteenth aspect, it is possible to provide the guide surface as a part of the guide groove with making the bicycle tensioner apparatus compact.

In accordance with a fifteenth aspect of the present invention, the bicycle tensioner apparatus according to any one of the above aspects is configured so that the guide surface includes a curved surface.

With the bicycle tensioner apparatus according to the fifteenth aspect, it is possible to smoothly adjust the tension applied from the tensioner to the driving-force transmitting member by using the curved surface of the guide surface.

In accordance with a sixteenth aspect of the present invention, the bicycle tensioner apparatus according to any one of the above aspects is configured so that the second base member is pivotally coupled to the first base member about a base pivot axis.

With the bicycle tensioner apparatus according to the sixteenth aspect, it is possible to apply the bicycle tensioner apparatus to a variety of base structures including the first base member and the second base member.

In accordance with a seventeenth aspect of the present invention, the bicycle tensioner apparatus according to any one of the above aspects is configured so that the guide follower is disposed on the support member and spaced apart from the support pivot axis.

With the bicycle tensioner apparatus according to the seventeenth aspect, it is possible to guide the support member with the guide follower to pivot about the support pivot axis.

In accordance with an eighteenth aspect of the present invention, the bicycle tensioner apparatus according to any one of the above aspects is configured so that the tensioner includes a coupling member coupling the first pulley and the guide follower to the support member together.

With the bicycle tensioner apparatus according to the eighteenth aspect, it is possible to share members which respectively couples the first pulley and the guide follower to the support member. This can simplify the structure of the bicycle tensioner apparatus.

In accordance with a nineteenth aspect of the present invention, the bicycle tensioner apparatus according to any one of the above aspects is configured so that the first base member includes a base frame to support a crank axle. The second base member includes a swing arm movably coupled to the base frame.

With the bicycle tensioner apparatus according to the nineteenth aspect, it is possible to apply the bicycle tensioner apparatus to a bicycle including the base frame and the swing arm.

In accordance with a twentieth aspect of the present invention, a bicycle tensioner comprises a first coupling portion, a second coupling portion, and a first guide member. The first coupling portion is configured to be movably coupled to one of a first base member and a second base member which is pivotably coupled to the first base member. The second coupling portion is configured to be coupled to the other of the first base member and the second base member. The first guide member is configured to contact a driving-force transmitting member.

With the bicycle tensioner according to the twentieth aspect, it is possible to guide the driving-force transmitting member in response to a relative movement between the first base member and the second base member.

In accordance with a twenty-first aspect of the present invention, the bicycle tensioner according to any one of the above aspects is configured so that the second coupling portion is pivotably coupled to the second base member about a support pivot axis.

With the bicycle tensioner according to the twenty-first aspect, it is possible to pivot the second coupling portion about the support pivot axis relative to the second base member In accordance with a twenty-second aspect of the present invention, the bicycle tensioner according to any one of the above aspects is configured so that the second coupling portion includes a pivot axle. The first coupling portion includes one of a projection and a recess.

With the bicycle tensioner according to the twenty-second aspect, it is possible to guide the driving-force transmitting member with a simple structure such as the projection and the recess.

In accordance with a twenty-third aspect of the present invention, the bicycle tensioner according to any one of the above aspects further comprises a support member to support the first coupling portion, the second coupling portion, and the first guide member.

With the bicycle tensioner according to the twenty-third aspect, it is possible to provide the bicycle tensioner as a single unit.

In accordance with a twenty-fourth aspect of the present invention, the bicycle tensioner according to any one of the above aspects further comprises a second guide member mounted to the support member to guide the driving-force transmitting member.

With the bicycle tensioner according to the twenty-fourth aspect, it is possible to stably guide the driving-force transmitting member with the first guide member and the second guide member.

In accordance with a twenty-fifth aspect of the present invention, the bicycle tensioner according to any one of the above aspects is configured so that the first guide member includes a first pulley rotatably coupled to the support member about a first rotational axis.

With the bicycle tensioner according to the twenty-fifth aspect, it is possible to smoothly guide the driving-force transmitting member such as a bicycle chain.

In accordance with a twenty-sixth aspect of the present invention, the bicycle tensioner according to any one of the above aspects is configured so that the second guide member includes a second pulley rotatably coupled to the support member about a second rotational axis.

With the bicycle tensioner according to the twenty-sixth aspect, it is possible to smoothly guide the driving-force transmitting member such as the bicycle chain.

In accordance with a twenty-seventh aspect of the present invention, the bicycle tensioner according to any one of the above aspects is configured so that the support pivot axis coincides with the second rotational axis.

With the bicycle tensioner according to the twenty-seventh aspect, it is possible to simplify the structure of the bicycle tensioner.

In accordance with a twenty-eighth aspect of the present invention, the bicycle tensioner according to any one of the above aspects further comprises a biasing member to apply a biasing force to the support member to pivot the support member about the support pivot axis.

With the bicycle tensioner according to the twenty-eighth aspect, it is possible to stabilize the orientation of the support member relative to the first base member and the second base member.

In accordance with a twenty-ninth aspect of the present invention, the bicycle tensioner according to any one of the above aspects further comprises a coupling member. The first coupling portion includes a projection. The coupling member couples the first pulley and the projection to the support member together.

With the bicycle tensioner according to the twenty-ninth aspect, it is possible to share members which respectively couples the first pulley and the projection to the support member. This can simplify the structure of the bicycle tensioner.

In accordance with a thirtieth aspect of the present invention, the bicycle tensioner according to any one of the above aspects is configured so that the projection includes a roller rotatable relative to the support member about a rotational axis defined along the first rotational axis.

With the bicycle tensioner according to the thirtieth aspect, it is possible to smoothly guide the driving-force transmitting member.

In accordance with a thirty-first aspect of the present invention, the bicycle tensioner according to any one of the above aspects is configured so that the rotational axis of the roller coincides with the first rotational axis.

With the bicycle tensioner according to the thirty-first aspect, it is possible to simplify the structure of the bicycle tensioner.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 29 shows an example of gear ratios defined by the first transmission member and the second transmission member of the transmission apparatus illustrated in FIG. 1.

FIG. 30 shows an example of combinations of a speed stage, a position of the first transmission member, and a position of a first guide member in the transmission apparatus illustrated in FIG. 1.

DESCRIPTION OF THE EMBODIMENTS

Figure 1:
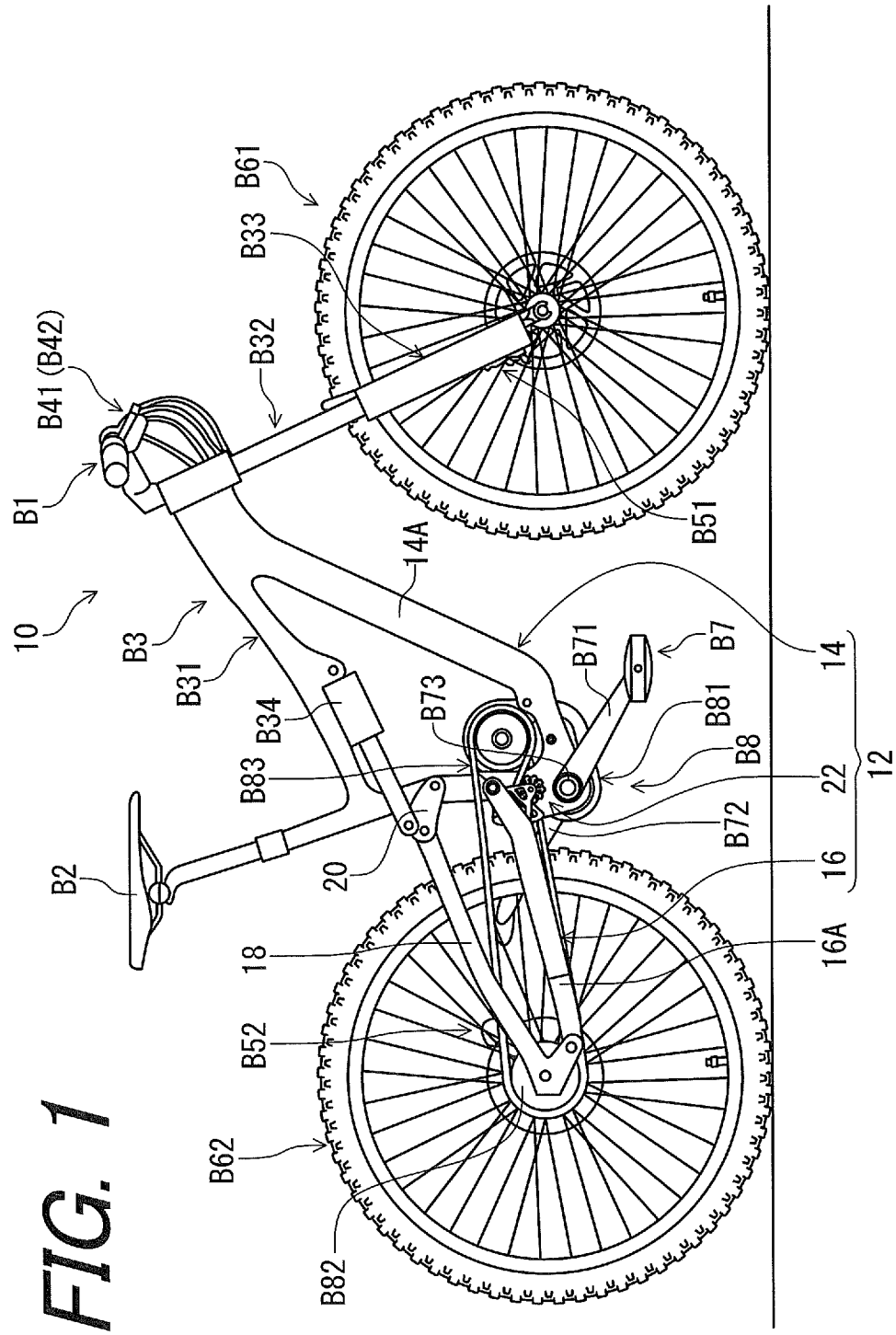
FIG. 1 is a side elevational view of a bicycle provided with a bicycle tensioner apparatus in accordance with a first embodiment (a higher position).

The embodiments will now be described with reference to the accompanying drawings, wherein like reference numerals designate corresponding or identical elements throughout the various drawings.

First Embodiment

Referring initially to FIG. 1, a bicycle 10 is illustrated that is equipped with a bicycle tensioner apparatus 12 in accordance with a first embodiment. While the bicycle 10 is illustrated as a mountain bike, the bicycle tensioner apparatus 12 can be applied to road bikes or any type of bicycle.

As seen in FIG. 1, the bicycle 10 includes a handlebar B1, a saddle B2, a bicycle body B3, a left operating device B41, a right operating device B42, a front braking device B51, a rear braking device B52, a front wheel B61, a rear wheel B62, a bicycle crank B7, and a drive train B8. The left operating device B41 is operatively coupled to one of the front braking device B51 and rear braking device B52 via a control cable. The right operating device B42 is operatively coupled to the other of the front braking device B51 and the rear braking device B52 via a control cable. The bicycle body B3 includes a bicycle frame B31 and a front fork B32 pivotally coupled to the bicycle frame B31. The front fork B32 includes a suspension B33. The drive train B8 includes a transmission apparatus B81, a rear sprocket B82, and a driving-force transmitting member B83. The transmission apparatus B81 is coupled to the rear sprocket B82 via the driving-force transmitting member B83. The bicycle crank B7 includes crank arms B71 and B72. The bicycle crank B7 is coupled to the transmission apparatus B81 to transmit a pedaling force to the transmission apparatus B81. The bicycle crank B7 includes a crank axle B73. The crank arms B71 and B72 are respectively secured to both axial ends of the crank axle B73.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle B2 of the bicycle 10 with facing the handlebar B1. Accordingly, these terms, as utilized to describe the bicycle tensioner apparatus 12, should be interpreted relative to the bicycle 10 equipped with the bicycle tensioner apparatus 12 as used in an upright riding position on a horizontal surface.

As seen in FIG. 1, the transmission apparatus B81 is mounted to the bicycle body B3. The transmission apparatus B81 is configured to transmit the pedaling force to the rear wheel B62 at a variable speed stage. The variable speed stage includes speed stages different from each other. The transmission apparatus B81 can have a continuously variable speed stage if needed and/or desired. The left operating device B41 and the right operating device B42 are operatively coupled to the transmission apparatus B81 to vary a speed stage of the transmission apparatus B81 via mechanical wires or electrical wires.

Figure 2:
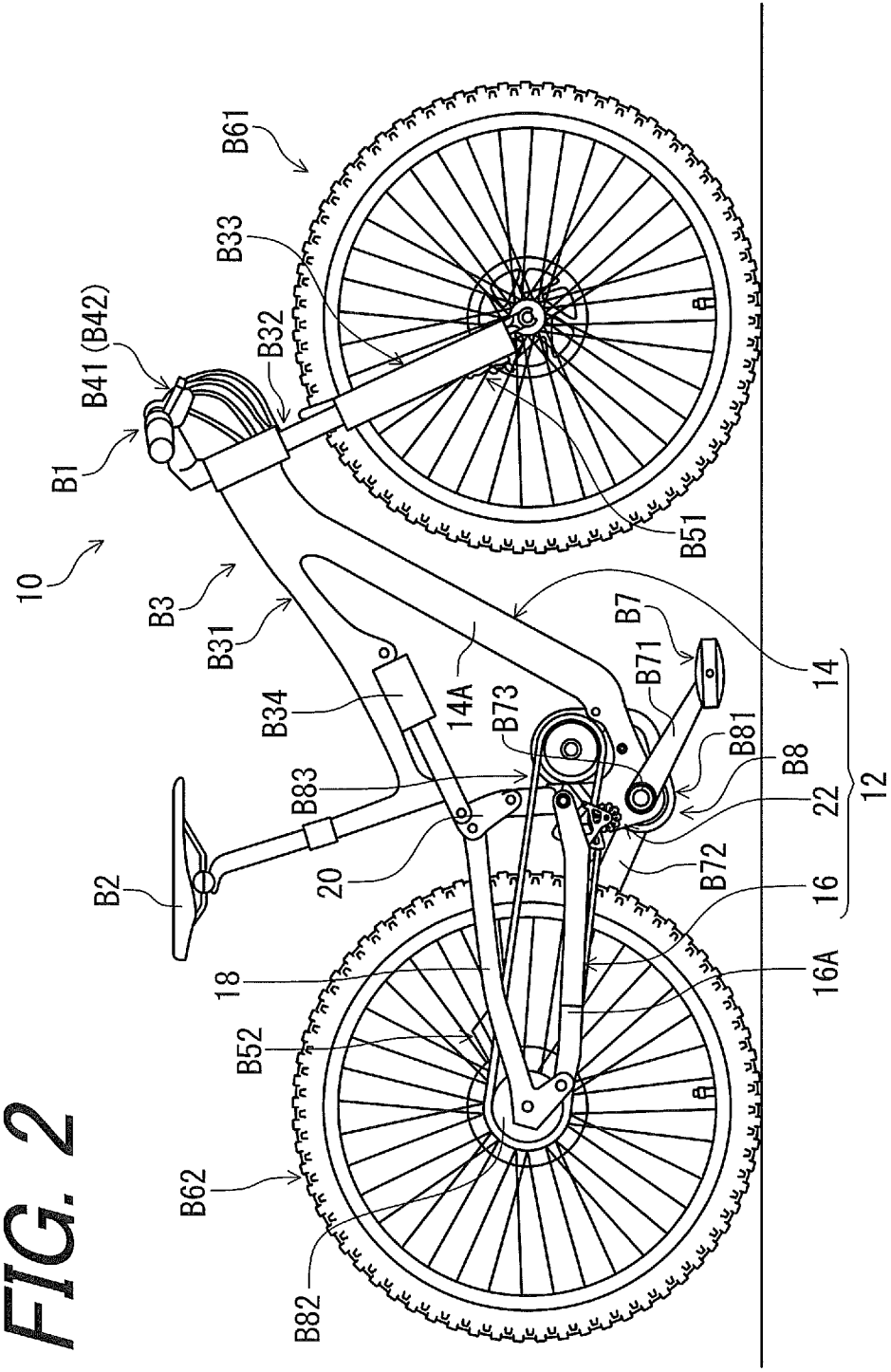
FIG. 2 is a side elevational view of the bicycle illustrated in FIG. 1 (a lower position).

As seen in FIGS. 1 and 2, the bicycle 10 has a higher position (FIG. 1) and a lower position (FIG. 2). The bicycle frame B31 includes a first base member 14, a second base member 16, a third base member 18, and a fourth base member 20. The front fork B32 is pivotally coupled to the first base member 14. The second base member 16 is movably coupled to the first base member 14. The second base member 16 is movably coupled to the third base member 18. The third base member 18 is movably coupled to the fourth base member 20. The fourth base member 20 is movably coupled to the first base member 14.

The first base member 14 includes a base frame 14A to support the crank axle B73. The second base member 16 includes a swing arm 16A movably coupled to the base frame 14A. However, the first base member 14 can include another member instead of or in addition to the base frame 14A. The second base member 16 can include another member instead of or in addition to the swing arm 16A.

In this embodiment, the second base member 16 is pivotally coupled to the first base member 14 about a first frame pivot axis. The second base member 16 is pivotally coupled to the third base member 18 about a second frame pivot axis. The third base member 18 is pivotally coupled to the fourth base member 20 about a third frame pivot axis. The fourth base member 20 is pivotally coupled to the first base member 14 about a fourth frame pivot axis. The first to fourth frame pivot axes are substantially parallel to each other. The rear wheel B62 is rotatably mounted to the third base member 18. The bicycle body B3 includes a damper B34 coupling the first base member 14 to the fourth base member 20. Alternatively, the second base member 16, the third base member 18, and the fourth base member 20 are integrally provided with each other as a one-piece unitary member. The structure of the bicycle frame B31 is not limited to this embodiment.

Figure 3:
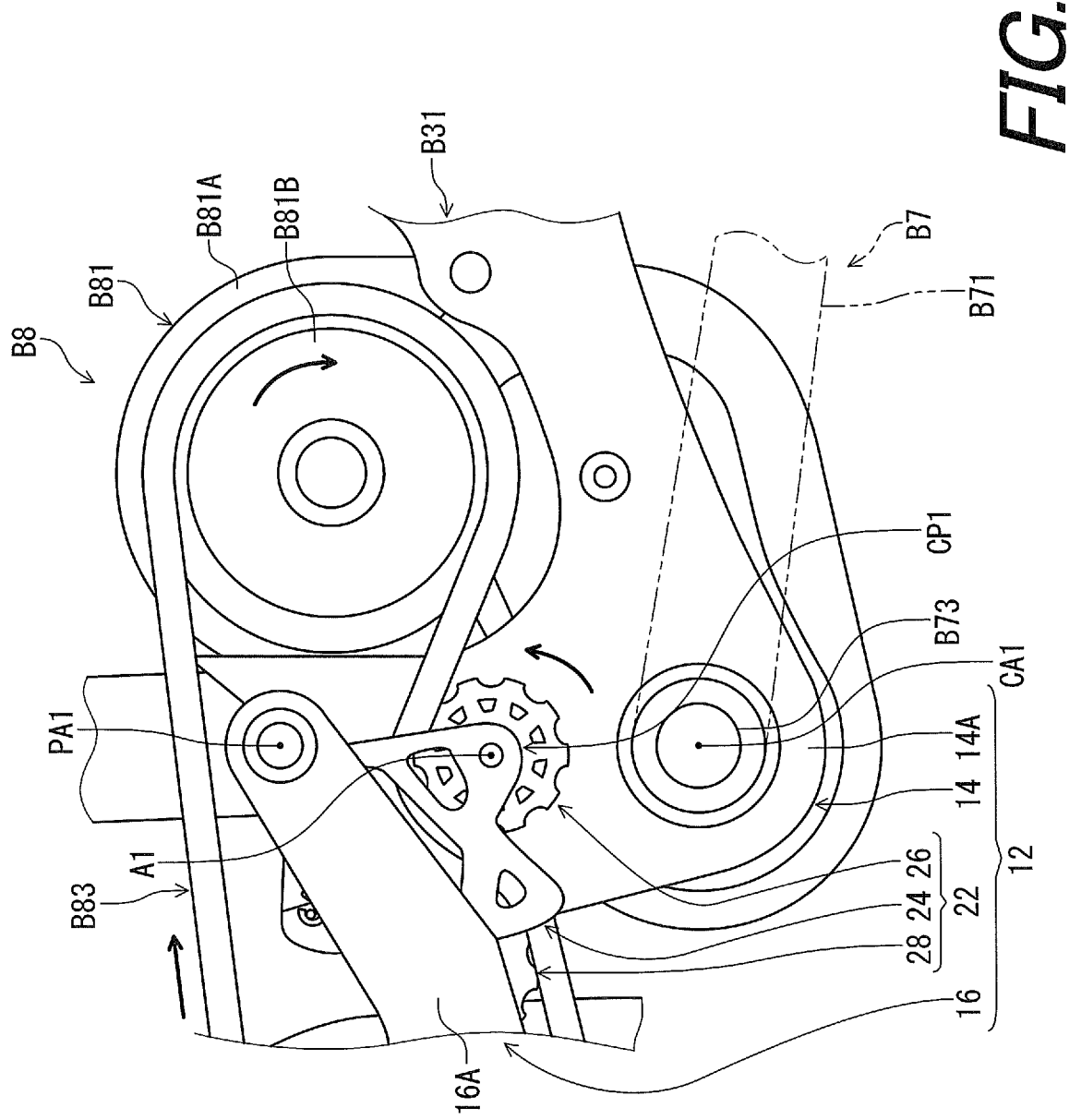
FIG. 3 is a partial side elevational view of the bicycle tensioner apparatus illustrated in FIG. 1 (the higher position).
Figure 4:
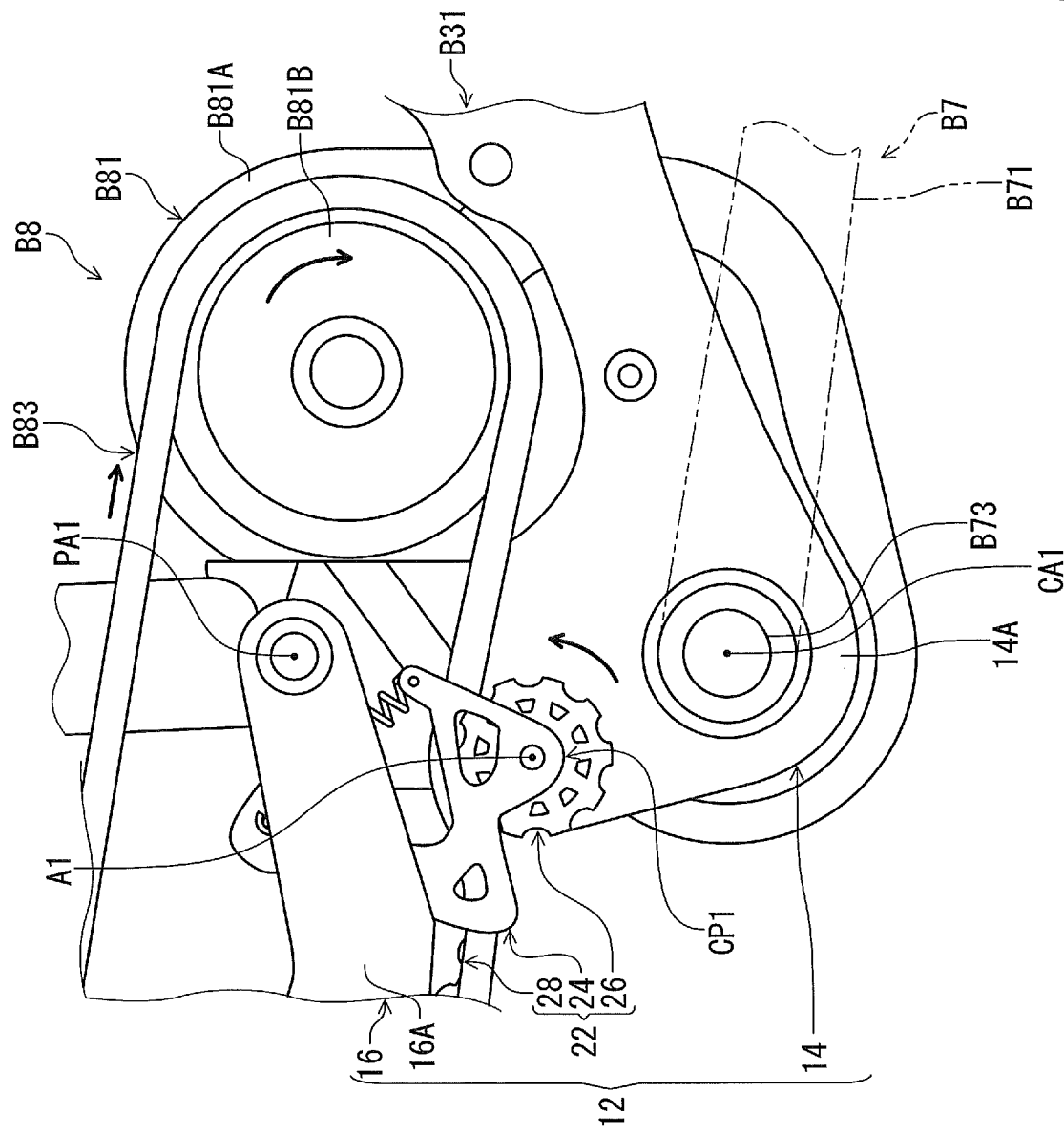
FIG. 4 is a partial side elevational view of the bicycle tensioner apparatus illustrated in FIG. 1 (the lower position).

As seen in FIGS. 3 and 4, the bicycle tensioner apparatus 12 comprises the first base member 14, the second base member 16, and a tensioner 22. In this embodiment, the first base member 14 and the second base member 16 at least partly constitute the bicycle frame B31. The tensioner 22 can also be referred to as a bicycle tensioner 22. The tensioner 22 is configured to contact the driving-force transmitting member B83 to apply tension to the driving-force transmitting member B83. The tensioner 22 is coupled to both the first base member 14 and the second base member 16. The tensioner 22 is movable relative to at least one of the first base member 14 and the second base member 16 in response to a relative movement between the first base member 14 and the second base member 16. In this embodiment, the tensioner 22 is movable relative to both the first base member 14 and the second base member 16 in response to the relative movement between the first base member 14 and the second base member 16. However, the tensioner 22 can be configured to be movable relative to only one of the first base member 14 and the second base member 16 in response to the relative movement between the first base member 14 and the second base member 16. In this embodiment, the driving-force transmitting member B83 includes a bicycle chain. However, the driving-force transmitting member B83 can include other member such as a belt.

The transmission apparatus B81 includes a housing B81A and an output member B81B. The housing B81A is secured to the first base member 14. The housing B81A can be integrally provided with the first base member 14 as a one-piece unitary member. The crank axle B73 of the bicycle crank B7 is rotatably mounted to the housing B81A about a crank rotational axis CA1. The output member B81B is rotatably mounted to the housing B81A and is engaged with the driving-force transmitting member B83 to transmit an output rotational force. Examples of the output member B81B include a cogwheel such as a sprocket or a pulley. The transmission apparatus B81 includes a shifting structure (described later) having a plurality of transmission members (e.g., cogwheels or gears) to define the speed stage of the transmission apparatus B81. The shifting structure varies a current speed stage among the speed stages and transmits a pedaling force from the bicycle crank B7 to the output member B81B. However, structures of the transmission apparatus B81 is not limited to this embodiment. For example, the transmission apparatus B81 can include, instead of or in addition to the shifting structure, an assist device (e.g., an assist motor) to apply an assist force to the output member B81B based on an input rotational force input to the bicycle crank B7. Furthermore, at least one of the shifting structure and the assist device can be omitted from the transmission apparatus B81. Since the transmission apparatus B81 includes structures that has been well known in the bicycle field, they will not be described in detail here for the sake of brevity. The transmission apparatus B81 can be omitted and the bicycle crank B7 can be a general bicycle crank assembly which have one or plural front sprockets.

Figure 5:
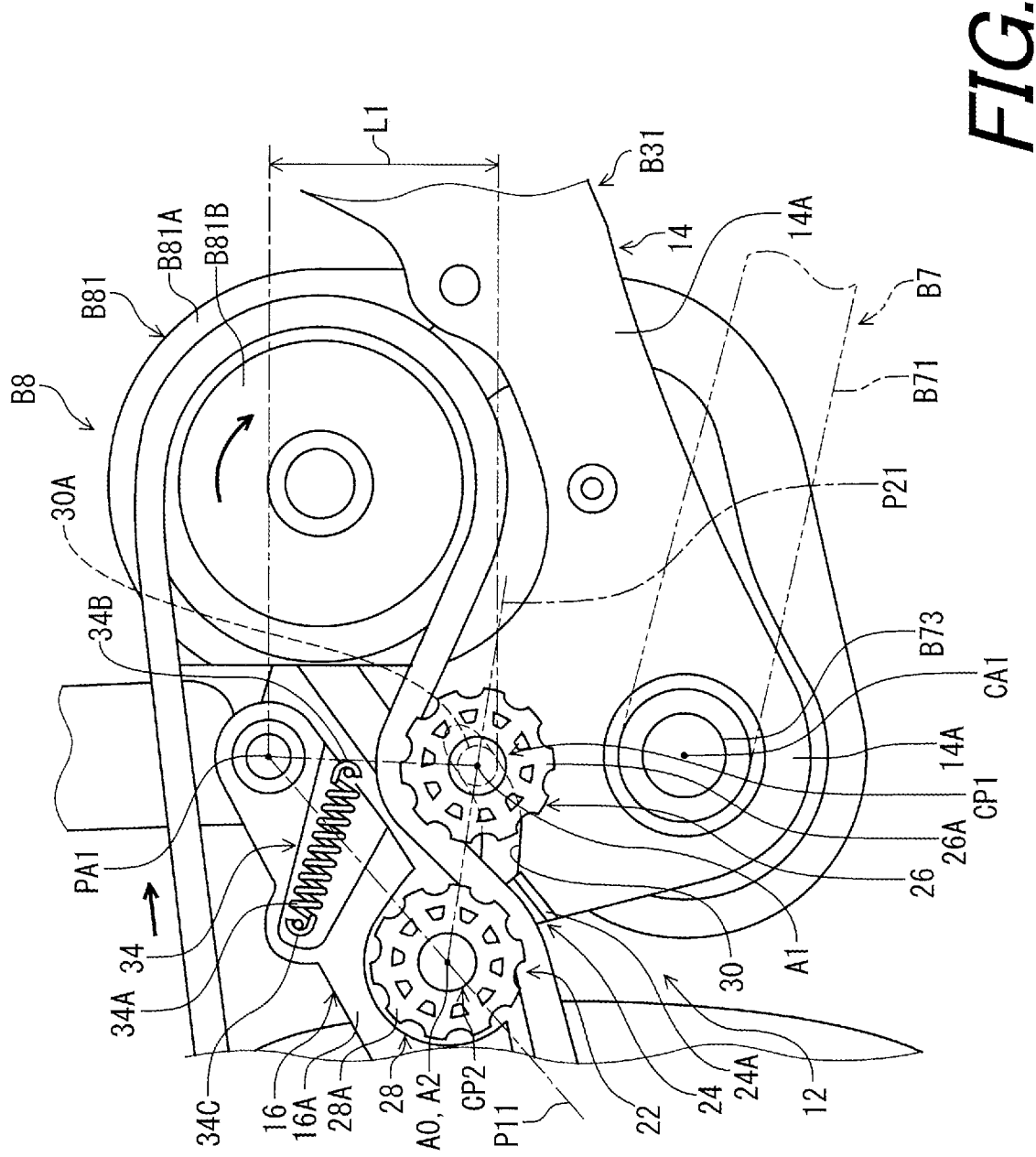
FIG. 5 is a partial cross-sectional view of the bicycle tensioner apparatus illustrated in FIG. 1 (the higher position).
Figure 6:
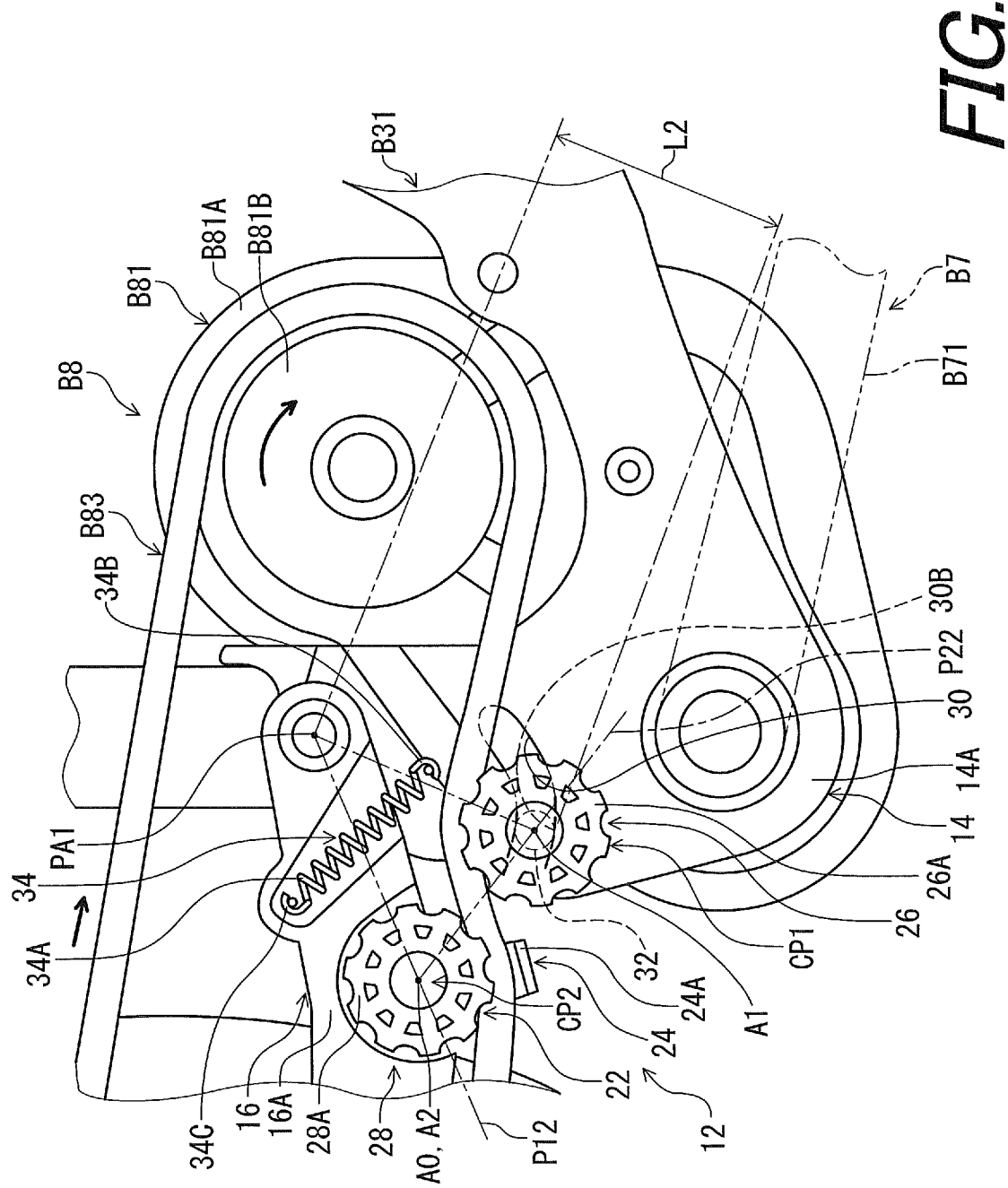
FIG. 6 is a partial cross-sectional view of the bicycle tensioner apparatus illustrated in FIG. 1 (the lower position).
Figure 7:
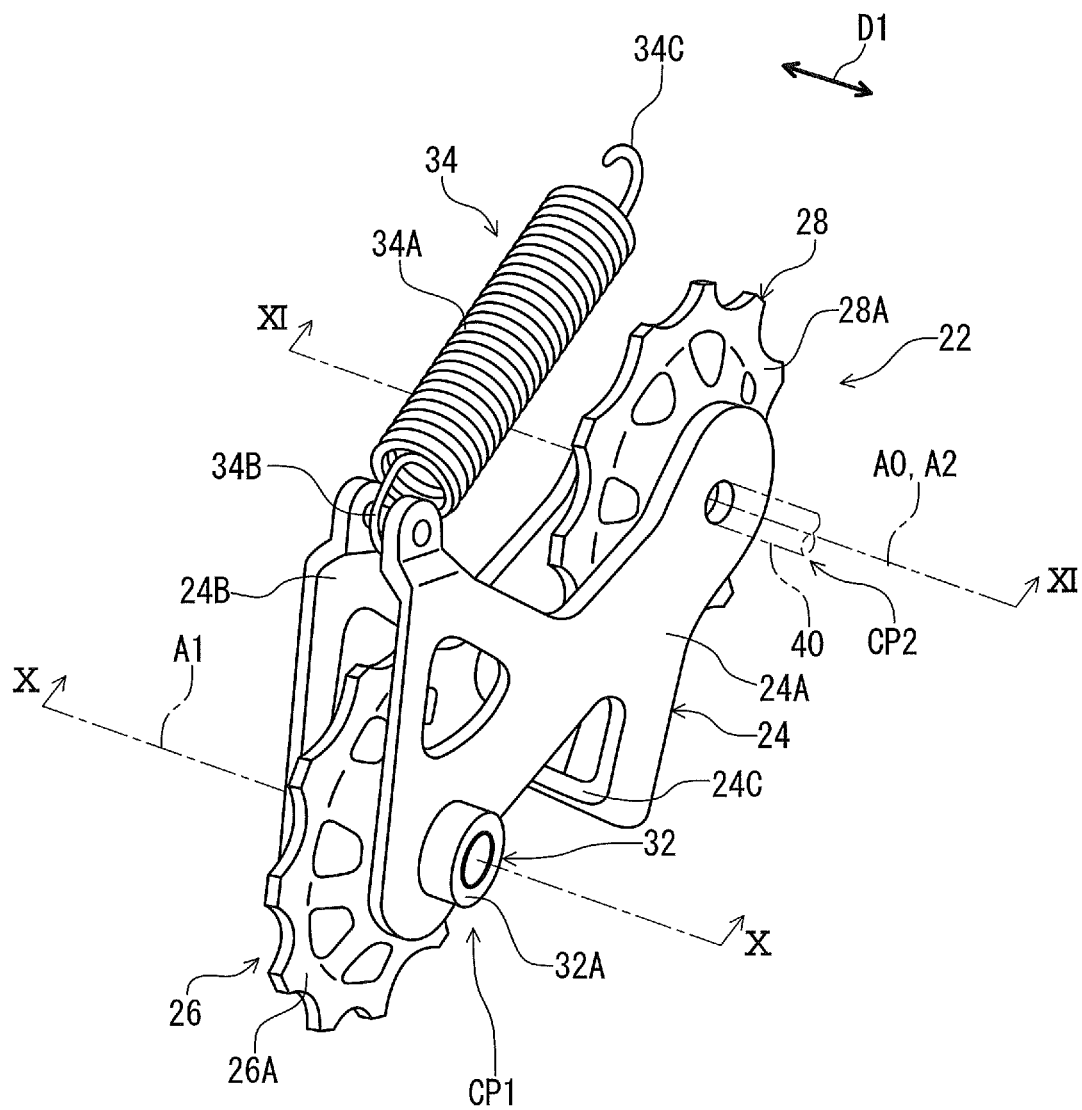
FIG. 7 is a perspective view of a bicycle tensioner of the bicycle tensioner apparatus illustrated in FIG. 1.

As seen in FIGS. 5 to 7, the tensioner 22 includes a support member 24 and a first guide member 26. The support member 24 is pivotally coupled to the second base member 16 about a support pivot axis A0. The first guide member 26 is mounted to the support member 24 to guide the driving-force transmitting member B83. In this embodiment, the first guide member 26 includes a first pulley 26A rotatably coupled to the support member 24 about a first rotational axis A1. However, the first guide member 26 can include a structure configured to be slidably contact the driving-force transmitting member B83 instead of or in addition to the first pulley 26A.

The tensioner 22 includes a second guide member 28 mounted to the support member 24 to guide the driving-force transmitting member B83. In this embodiment, the second guide member 28 includes a second pulley 28A rotatably coupled to the support member 24 about a second rotational axis A2. However, the second guide member 28 can include a structure configured to be slidably contact the driving-force transmitting member B83 instead of or in addition to the second pulley 28A. In this embodiment, the support pivot axis A0 coincides with the second rotational axis A2. However, the support pivot axis A0 can be offset from the second rotational axis A2. The support pivot axis A0 and the second rotational axis A2 are substantially parallel to the crank rotational axis CA1.

Figure 8:
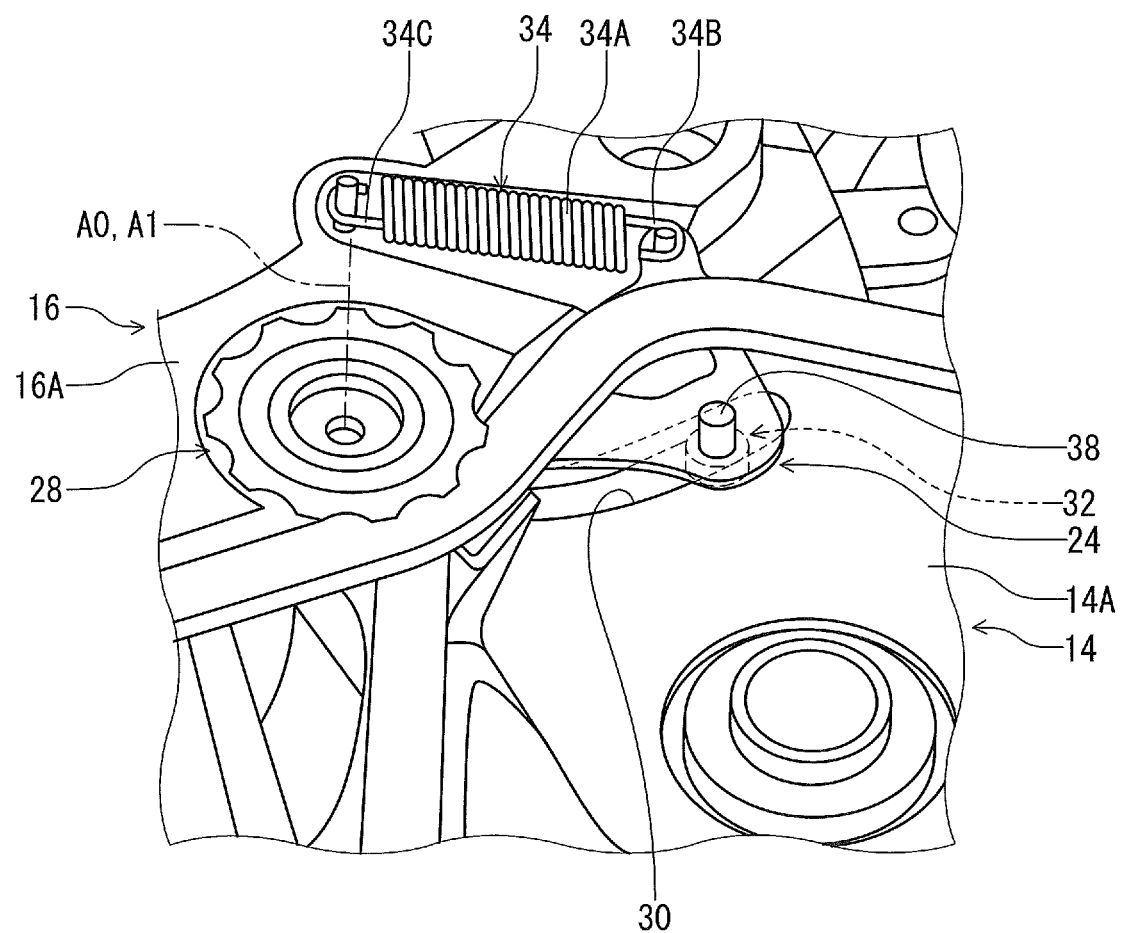
FIG. 8 is a perspective view of the bicycle tensioner apparatus illustrated in FIG. 1.

As seen in FIGS. 7 and 8, one of the first base member 14 and the second base member 16 includes one of a guide surface 30 and a guide follower 32. The tensioner 22 includes the other of the guide surface 30 and the guide follower 32. In this embodiment, the first base member 14 includes the guide surface 30. The tensioner 22 includes the guide follower 32. However, the second base member 16 can include the guide surface 30. One of the first base member 14 and the second base member 16 can include the guide follower 32, and the tensioner 22 can include the guide surface 30. The guide follower 32 can also be referred to as a projection 32. One of the guide surface 30 and the guide follower 32 is provided at the support member 24. In this embodiment, the guide follower 32 is provided at the support member 24. However, the guide surface 30 can be provided at the support member 24. The guide surface 30 can be provided on the housing B81A of the transmission apparatus B81 or another member which is coupled to the transmission apparatus B81 and/or the bicycle frame B31.

As seen in FIG. 7, the support member 24 includes a first guide plate 24A, a second guide plate 24B, and a guide portion 24C. The first guide plate 24A is spaced apart from the second guide plate 24B in an axial direction D1 parallel to the first rotational axis A1. In this embodiment, the axial direction D1 is parallel to each of the first rotational axis A1 and the second rotational axis A2. The first guide member 26 and the second guide member 28 are disposed between the first guide plate 24A and the second guide plate 24B in the axial direction D1. The guide portion 24C extends between the first guide plate 24A and the second guide plate 24B in the axial direction D1 to prevent the driving-force transmitting member B83 from disengaging from the second guide member 28.

As seen in FIG. 8, the guide follower 32 is disposed on the guide surface 30 to move the tensioner 22 relative to the one of the first base member 14 and the second base member 16 in response to the relative movement between the first base member 14 and the second base member 16. In this embodiment, the guide follower 32 is disposed on the guide surface 30 to move the tensioner 22 relative to the first base member 14 in response to the relative movement between the first base member 14 and the second base member 16. The guide follower 32 is pushed against the guide surface 30 because of a force (a reaction force of the tension) applied from the driving-force transmitting member B83 to the first guide member 26. The guide surface 30 receives the force applied from the driving-force transmitting member B83 to the first guide member 26.

As seen in FIGS. 5 to 7, the bicycle tensioner 22 comprises a first coupling portion CP1, a second coupling portion CP2, and the first guide member 26. The first coupling portion CP1 is configured to be movably coupled to one of the first base member 14 and the second base member 16 which is pivotably coupled to the first base member 14. The second coupling portion CP2 is configured to be coupled to the other of the first base member 14 and the second base member 16. In this embodiment, the first coupling portion CP1 is configured to be movably coupled to the first base member 14. The second coupling portion CP2 is configured to be coupled to the second base member 16. However, the first coupling portion CP1 can be configured to be movably coupled to the second base member 16, and the second coupling portion CP2 can be configured to be coupled to the first base member 14. The first guide member 26 is configured to contact the driving-force transmitting member B83. The bicycle tensioner 22 further comprises the second guide member 28 mounted to the support member 24 to guide the driving-force transmitting member B83.

The bicycle tensioner 22 further comprises the support member 24 to support the first coupling portion CP1, the second coupling portion CP2, and the first guide member 26. In this embodiment, the support member 24 supports the first coupling portion CP1, the second coupling portion CP2, the first guide member 26, and the second guide member 28.

The second coupling portion CP2 is pivotably coupled to the second base member 16 about the support pivot axis A0. The first coupling portion CP1 includes one of the projection 32 and the recess 36. In this embodiment, the first coupling portion CP1 includes the projection 32. The first base member 14 includes the recess 36. However, the first coupling portion CP1 can include the recess 36, and the first base member 14 can include the projection 32.

As seen in FIGS. 7 and 8, the tensioner 22 includes a biasing member 34 to apply a biasing force to the support member 24 to pivot the support member 24 about the support pivot axis A0. However, the biasing member 34 can be omitted from the tensioner 22. In this embodiment, the biasing member 34 includes a coil tension spring. However, the biasing member 34 is not limited to this embodiment. Furthermore, the biasing member 34 can be omitted from the bicycle tensioner apparatus 12.

The biasing member 34 includes a coiled body 34A, a first end part 34B, and a second end part 34C. The coiled body 34A generates a biasing force. The first end part 34B is provided at one end of the coiled body 34A. The second end part 34C is provided at the other end of the coiled body 34A. The coiled body 34A is provided between the first end part 34B and the second end part 34C. The first end part 34B is coupled to the support member 24. The second end part 34C is coupled to the second base member 16.

As seen in FIGS. 5 and 6, the second base member 16 is movable relative to the first base member 14 between a first base position P11 and a second base position P12. In this embodiment, the second base member 16 is pivotally coupled to the first base member 14 about a base pivot axis PA1. The second base member 16 is pivotable relative to the first base member 14 about the base pivot axis PA1 between the first base position P11 and the second base position P12. In FIGS. 5 and 6, the first base position P11 and the second base position P12 are defined relative to the first base member 14 based on the base pivot axis PA1 and the support pivot axis A0. The base pivot axis PA1 is substantially parallel to the crank rotational axis CA1.

The tensioner 22 is pivotable relative to the second base member 16 about the support pivot axis A0 between a first pivot position P21 and a second pivot position P22. In this embodiment, the first pivot position P21 and the second pivot position P22 are defined relative to the second base member 16 based on the support pivot axis A0 and the first rotational axis A1.

As seen in FIG. 8, the guide follower 32 is disposed on the support member 24. The guide follower 32 is spaced apart from the support pivot axis A0. The guide follower 32 is in contact with the guide surface 30. As seen in FIGS. 5, 6, and 8, the guide follower 32 is disposed on the guide surface 30 to move the tensioner 22 from the first pivot position P21 to the second pivot position P22 in response to a movement of the second base member 16 from the first base position P11 to the second base position P12. The guide surface 30 includes a first guide part 30A and a second guide part 30B. As seen in FIG. 5, the tensioner 22 is positioned at the first pivot position P21 in a state where the guide follower 32 is disposed on the first guide part 30A. As seen in FIG. 6, the tensioner 22 is positioned at the second pivot position P22 in a state where the guide follower 32 is disposed on the second guide part 30B.

As seen in FIGS. 5 and 6, a first distance L1 defined between the base pivot axis PA1 and the first guide part 30A is different from a second distance L2 defined between the base pivot axis PA1 and the second guide part 30B. In this embodiment, the first distance L1 is shorter than the second distance L2. However, the first distance L1 can be equal to or longer than the second distance L2.

Figure 9:
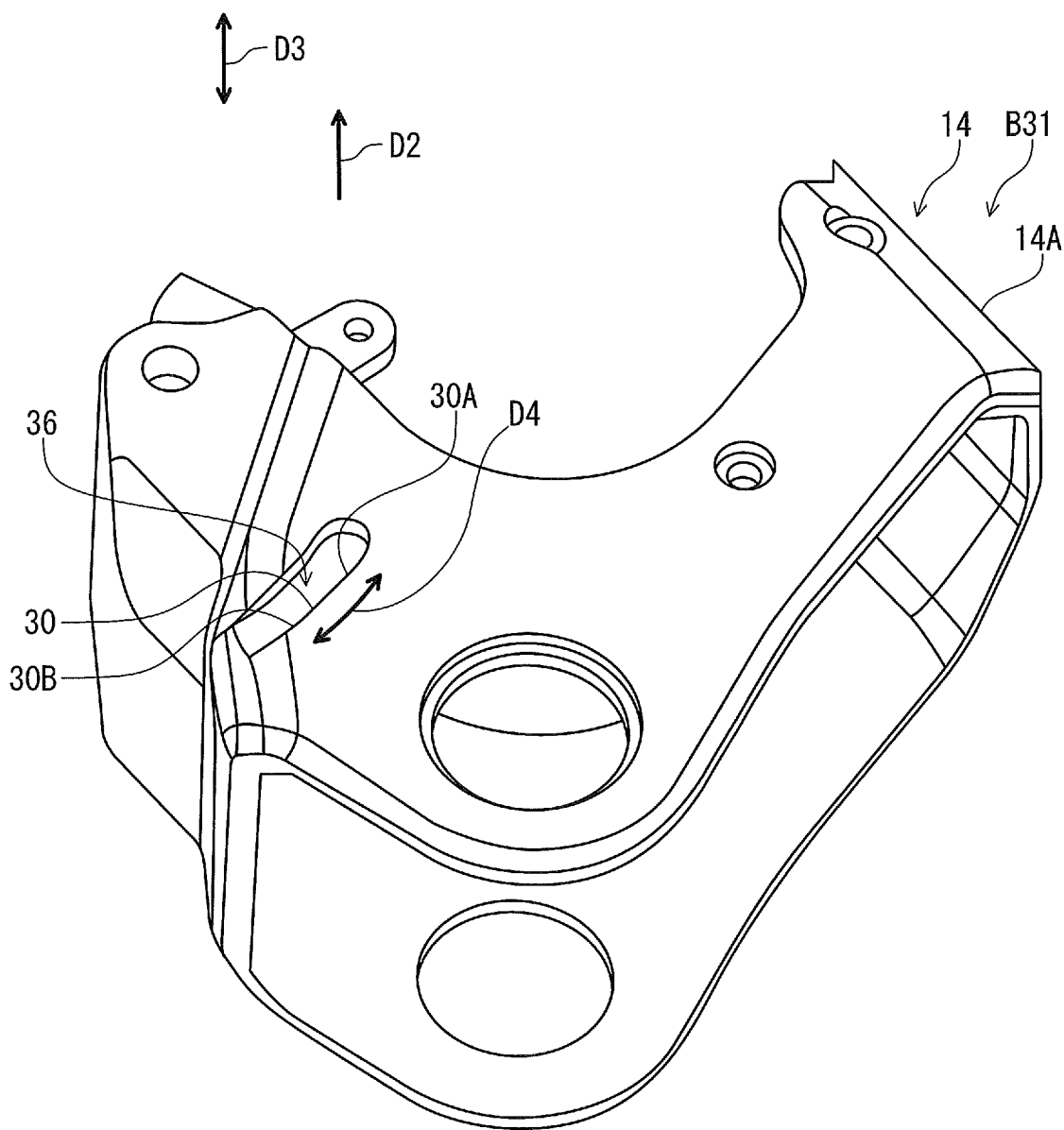
FIG. 9 is a perspective view of a first base member of the bicycle tensioner apparatus illustrated in FIG. 1.

As seen in FIG. 9, the one of the first base member 14 and the second base member 16 includes a guide groove 36. The guide surface 30 at least partly define the guide groove 36. The guide follower 32 is disposed in the guide groove 36. The guide groove 36 extends between at least the first guide part 30A and the second guide part 30B. In this embodiment, the first base member 14 includes the guide groove 36. However, the second base member 16 can include the guide groove 36. Furthermore, the guide groove 36 can be omitted from the first base member 14. The guide surface 30 includes a curved surface. A width direction of the guide surface 30 is substantially parallel to the first rotational axis A1. The guide surface 30 is preferably not curved in the width direction. However, the shape of the guide surface 30 is not limited to this embodiment. The guide groove 36 can also be referred to as a recess 36. The guide groove 36 is opened from a transverse center plane of the bicycle frame B31 in an outward direction D2 of a transverse direction D3. The guide groove 36 is preferably opened at the end of the guide surface 30 in a curved direction D4 to introduce the guide follower 32 into the guide groove 36.

Figure 10:
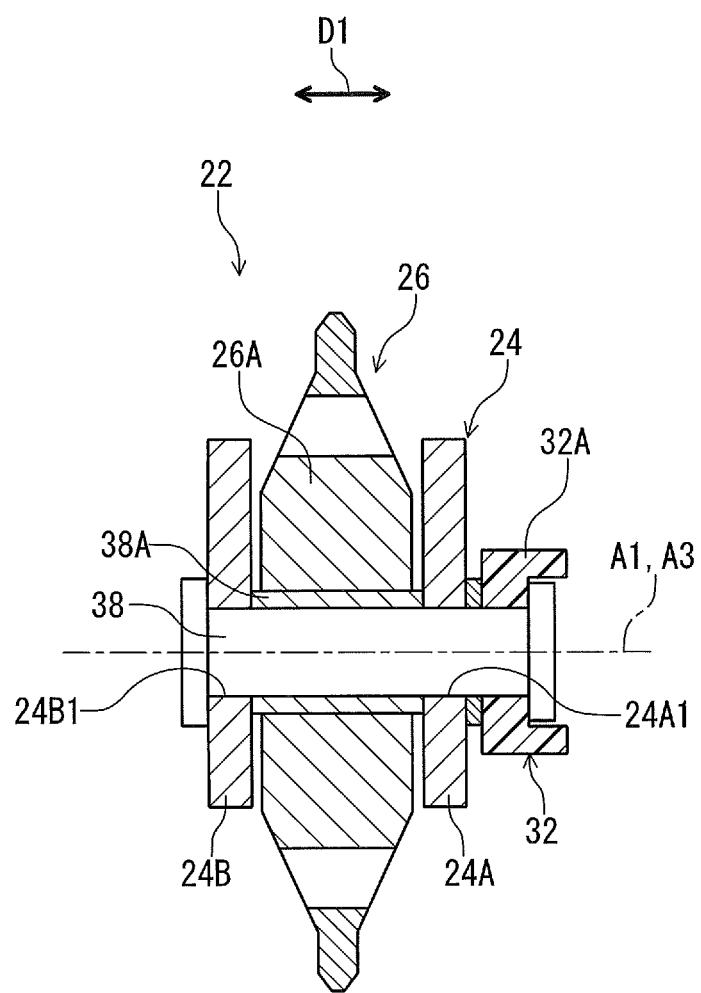
FIG. 10 is a cross-sectional view of the bicycle tensioner apparatus taken along line X-X of FIG. 7.

As seen in FIG. 10, the bicycle tensioner 22 further comprises a coupling member 38. The coupling member 38 couples the first pulley 26A and the guide follower 32 to the support member 24 together. The coupling member 38 couples the first pulley 26A and the projection 32 to the support member 24 together. The projection 32 includes a roller 32A rotatable relative to the support member 24 about a rotational axis A3 defined along the first rotational axis A1. The roller 32A is rotatably coupled to the support member 24 via the coupling member 38. The first pulley 26A is rotatably supported by the coupling member 38. The coupling member 38 is non-rotatably fixed on the support member 24. However, the first pulley 26A can be non-rotatably fixed on the coupling member 38, and the coupling member 38 can be rotatably supported by the support member 24. A first bush 38A is preferably disposed between the first pulley 26A and the coupling member 38. The roller 32A is preferably made of synthetic resin. However, a material of the roller 32A is not limited to a resin material. The roller 32A can be made of another material such as a metallic material. The first guide plate 24A includes a first support hole 24A1. The second guide plate 24B includes a second support hole 24B1. The coupling member 38 extends through the first support hole 24A1 and the second support hole 24B1 in the axial direction D1. The coupling member 38 is coupled to the first and second guide plates 24A and 24B. In this embodiment, the rotational axis A3 of the roller 32A coincides with the first rotational axis A1. In this embodiment, the coupling member 38 includes a rivet. However, the structure of the coupling member 38 is not limited to this embodiment. The coupling member 38 can include a bolt and nut.

Figure 11:
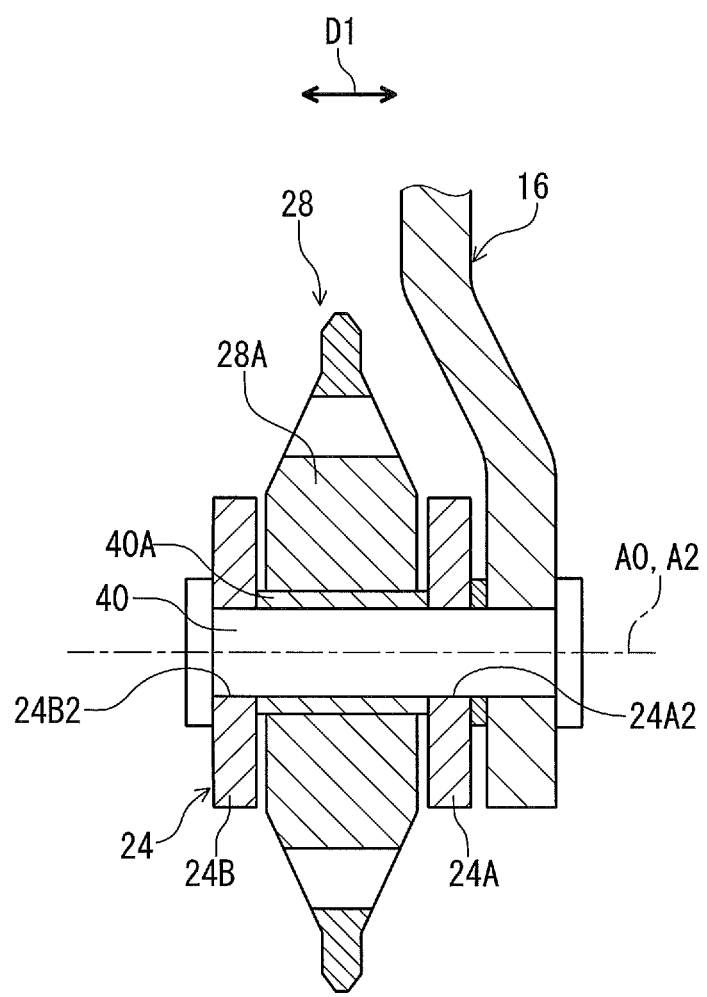
FIG. 11 is a cross-sectional view of the bicycle tensioner apparatus taken along line XI-XI of FIG. 7.

As seen in FIG. 11, the second coupling portion CP2 includes a pivot axle 40. The pivot axle 40 rotatably couples the second guide member 28 to the second base member 16 about the second rotational axis A2. The pivot axle 40 pivotally couples the support member 24 to the second base member 16 about the support pivot axis A0. The second pulley 28A is rotatably supported by the pivot axle 40. The pivot axle 40 is non-rotatably fixed on the second base member 16. However, the second pulley 28A can be non-rotatably fixed on the pivot axle 40, and the pivot axle 40 can be rotatably supported by the second base member 16. A second bush 40A is disposed between the second pulley 28A and the pivot axle 40. The first guide plate 24A includes a first additional support hole 24A2. The second guide plate 24B includes a second additional support hole 24B2. The pivot axle 40 extends through the first additional support hole 24A2 and the second additional support hole 24B2 in the axial direction D1. The pivot axle 40 is coupled to the first and second guide plates 24A and 24B. In this embodiment, the pivot axle 40 includes a rivet. However, the pivot axle 40 is not limited to this embodiment. The pivot axle 40 can include a bolt and nut.

Figure 12:
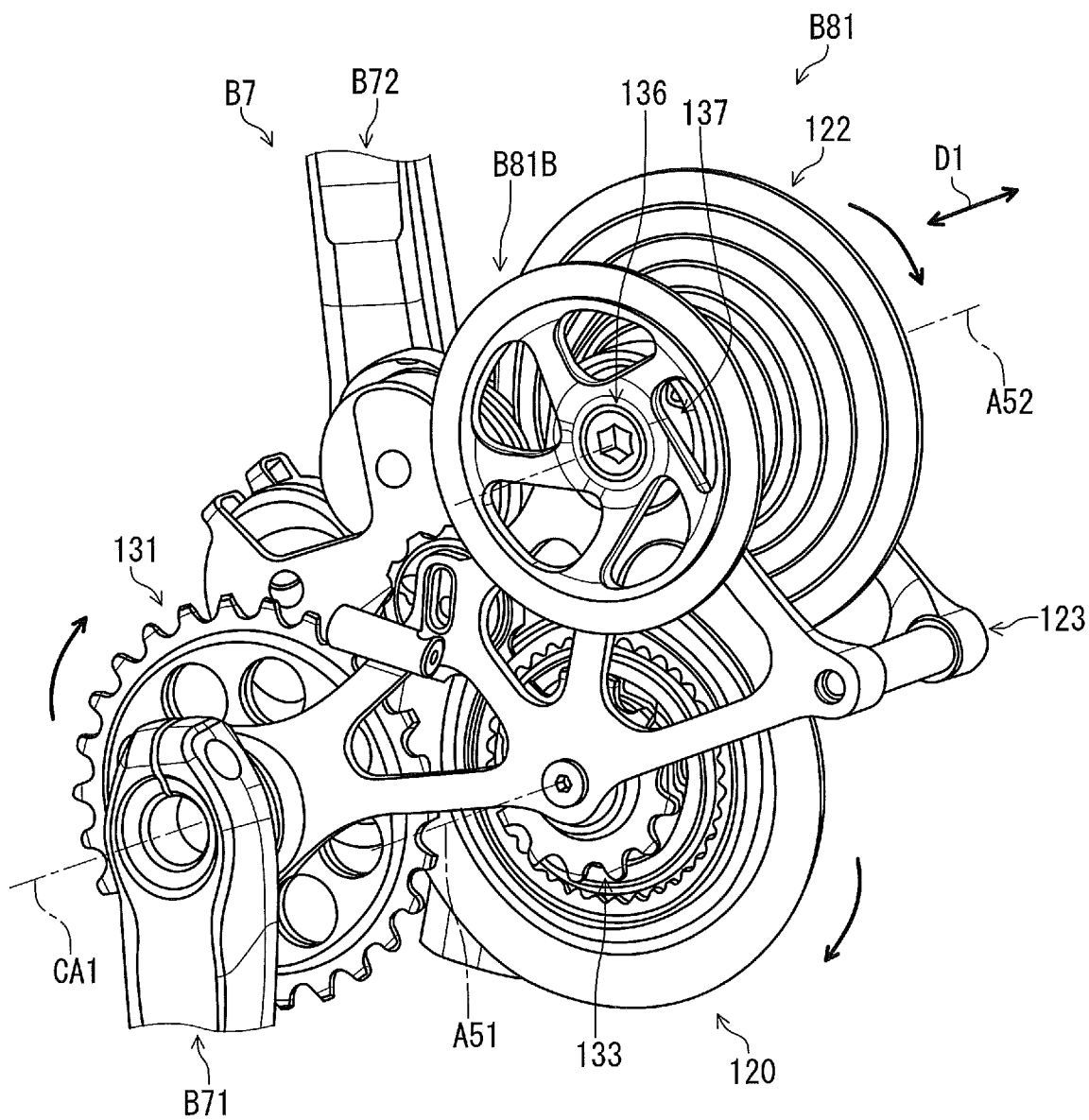
FIG. 12 is a perspective view of a transmission apparatus of the bicycle illustrated in FIG. 1, with a housing omitted.
Figure 13:
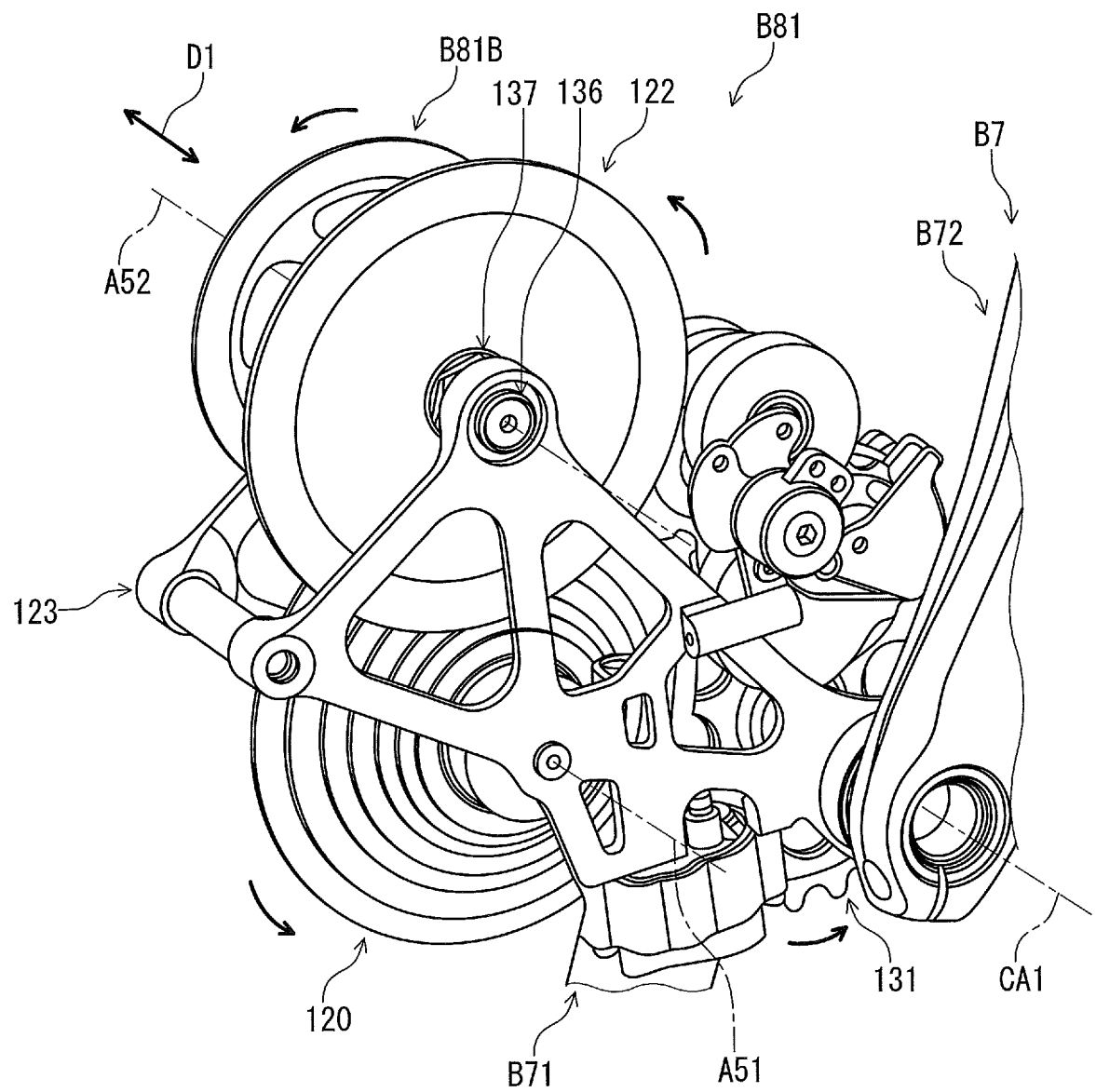
FIG. 13 is another perspective view of the transmission apparatus illustrated in FIG. 1, with a housing omitted.

As seen in FIGS. 12 and 13, for example, the transmission apparatus B81 further includes a first transmission member 120, a second transmission member 122, and a transmission frame 123. The first transmission member 120, the second transmission member 122, and the transmission frame 123 are provided in the housing B81A (FIG. 4). The transmission frame 123 is secured to the housing B81A (FIG. 4). The first transmission member 120 is rotatably coupled to the transmission frame 123. The second transmission member 122 is rotatably coupled to the transmission frame 123. Specifically, the first transmission member 120 is rotatable relative to the transmission frame 123 about a first axis A51. The second transmission member 122 is rotatable relative to the transmission frame 123 about a second axis A52. The second axis A52 is parallel to the first axis A51 in this embodiment. However, the second axis A52 can be non-parallel to the first axis A51 if needed and/or desired. The first axis A51 and the second axis A52 are parallel to the axial direction D1. However, at least one of the first axis A51 and the second axis A52 can be non-parallel to the axial direction D1.

Figure 14:
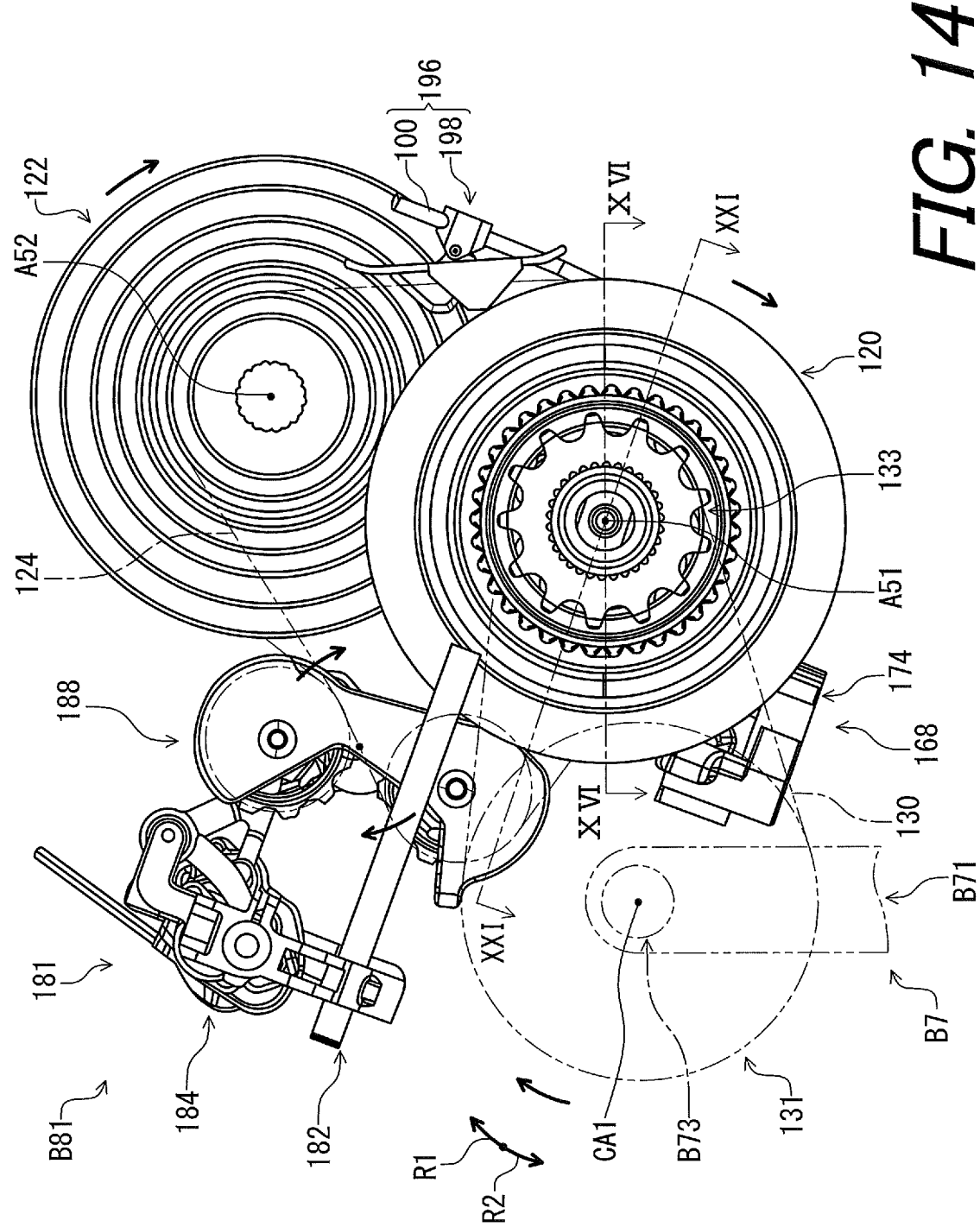
FIG. 14 is a side elevational view of the transmission apparatus illustrated in FIG. 1, with a housing omitted.
Figure 15:
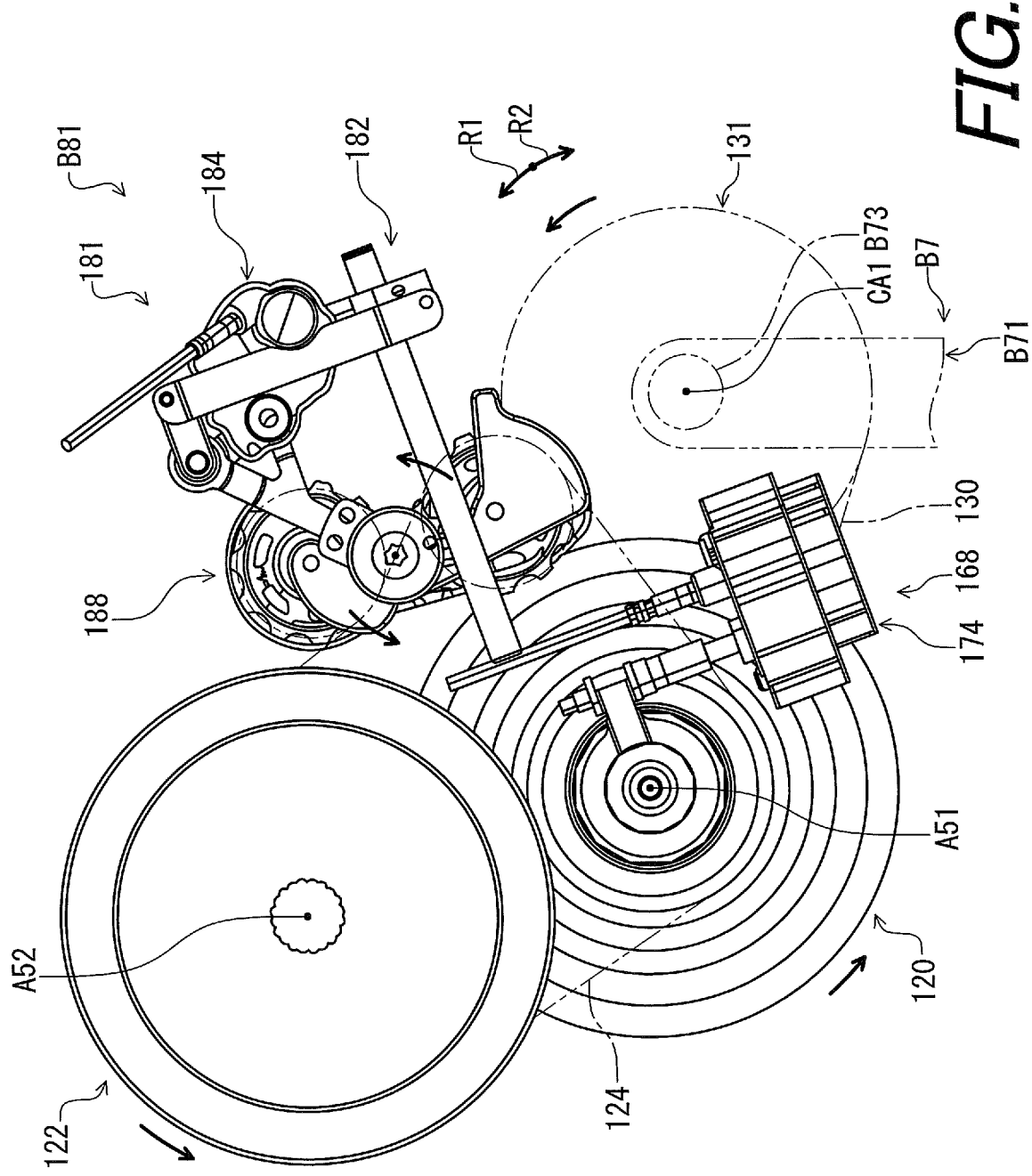
FIG. 15 is a side elevational view of the transmission apparatus illustrated in FIG. 1, with a housing omitted.

As seen in FIGS. 14 and 15, the transmission apparatus B81 comprises a first coupling member 124. The first coupling member 124 is configured to couple the first transmission member 120 to the second transmission member 122 to transmit rotation of one of the first transmission member 120 and the second transmission member 122 to the other of the first transmission member 120 and the second transmission member 122 at a variable speed stage.

In this embodiment, the first coupling member 124 is configured to couple the first transmission member 120 to the second transmission member 122 to transmit rotation of the first transmission member 120 to the second transmission member 122 at the variable speed stage. However, the first coupling member 124 can be configured to couple the first transmission member 120 to the second transmission member 122 to transmit rotation of the second transmission member 122 to the first transmission member 120 at the variable speed stage.

The first coupling member 124 has an annular shape (a closed-loop shape) to surround the first axis A51 and the second axis A52 when viewed from the axial direction D1 (FIGS. 12 and 13). The first coupling member 124 is provided in the housing B81A (FIG. 4). In this embodiment, the first coupling member 124 comprises a bicycle chain configured to engage with the first transmission member 120 and the second transmission member 122. The first coupling member 124 has a first chain pitch smaller than a reference chain pitch of the driving-force transmitting member B83 (FIG. 6). For example, the first chain pitch of the first coupling member 124 is smaller than 12.7 mm, for example. The first chain pitch of the first coupling member 124 is preferably equal to or smaller than 10 mm. The first chain pitch of the first coupling member 124 is more preferably equal to or smaller than 8.4 mm. The reference chain pitch of the driving-force transmitting member B83 is equal to 12.7 mm. The first coupling member 124 can comprise a coupling member such as a coupling belt. The first transmission member 120 and the second transmission member 122 partially overlap with each other when viewed from the axial direction D1.

As seen in FIGS. 14 and 15, the transmission apparatus B81 further comprises an input coupling member 130. The input coupling member 130 is configured to couple the crank axle B73 to the first transmission member 120 to transmit rotation of the crank axle B73 to the first transmission member 120. The first transmission member 120 is configured to be coupled to the crank axle B73 via the input coupling member 130 to rotate with the crank axle B73 relative to the transmission frame 123.

The input coupling member 130 has an annular shape (a closed-loop shape) to surround the crank rotational axis CA1 and the first axis A51 when viewed from the axial direction D1. The input coupling member 130 is provided in the housing B81A (FIG. 4). In this embodiment, the input coupling member 130 comprises a bicycle chain configured to couple the crank axle B73 to the first transmission member 120. The input coupling member 130 has a second chain pitch smaller than the reference chain pitch of the driving-force transmitting member B83 (FIG. 6). For example, the second chain pitch of the input coupling member 130 is smaller than 12.7 mm, for example. The second chain pitch of the input coupling member 130 is preferably equal to or smaller than 10 mm. The second chain pitch of the input coupling member 130 is more preferably equal to or smaller than 8.4 mm. The reference chain pitch of the driving-force transmitting member B83 is equal to 12.7 mm. Furthermore, the second chain pitch of the input coupling member 130 is equal to the first chain pitch of the first coupling member 124. However, the second chain pitch of the input coupling member 130 can be different from the first chain pitch of the first coupling member 124. The input coupling member 130 can comprise a coupling member such as a coupling belt.

The transmission apparatus B81 further comprises an input cogwheel 131. The input cogwheel 131 is configured to be coupled to the crank axle B73 to rotate together with the crank axle B73 relative to the transmission frame 123 about the crank rotational axis CA1.

Figure 16:
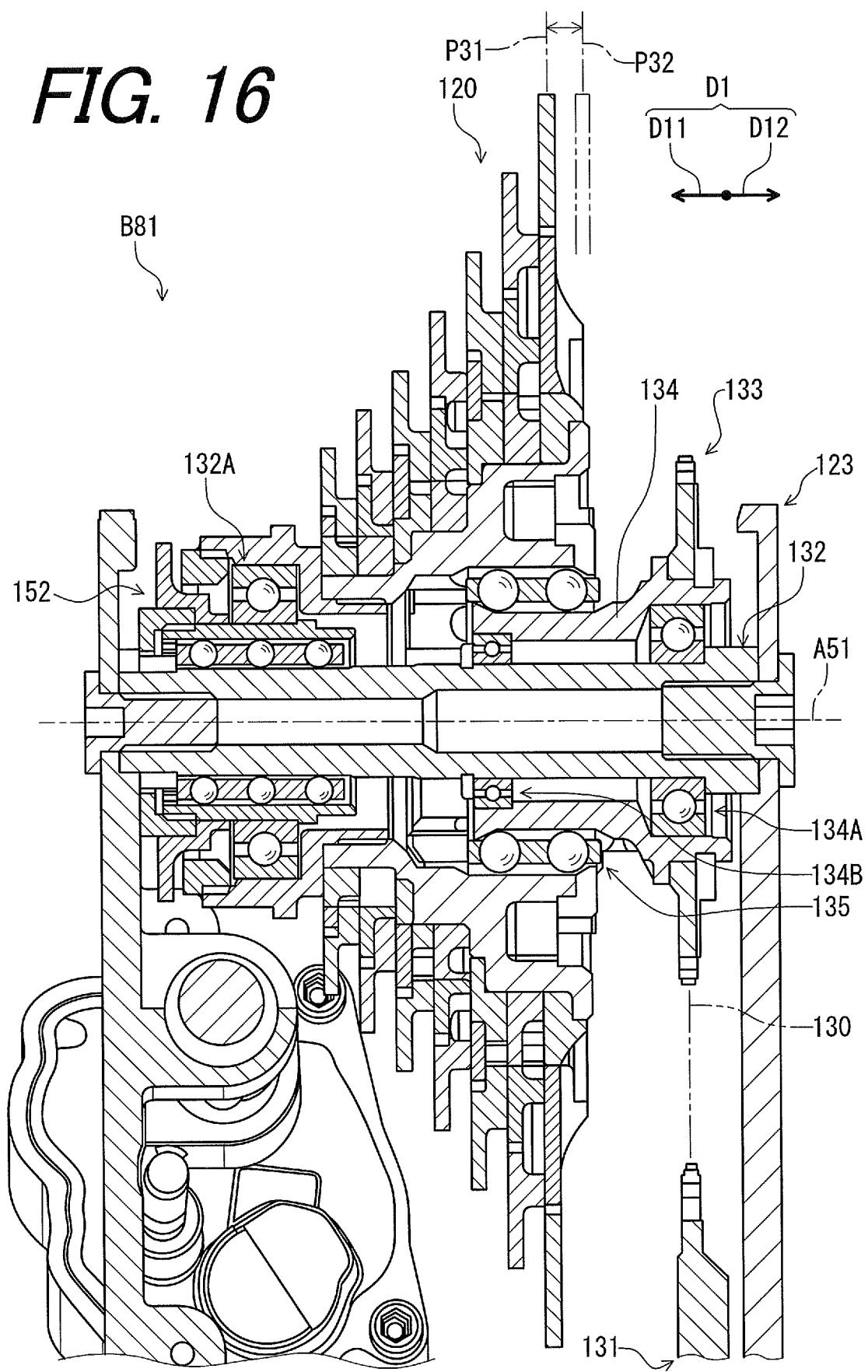
FIG. 16 is a cross-sectional view of the transmission apparatus taken along line XVI-XVI of FIG. 14.

As seen in FIG. 16, the transmission apparatus B81 further comprises a first shaft 132, a first bearing assembly 132A, an intermediate cogwheel 133, an intermediate support body 134, and intermediate bearing assemblies 134A and 134B. The first shaft 132 defines the first axis A51. The first transmission member 120 is rotatable relative to the first shaft 132 about the first axis A51. The first bearing assembly 132A is provided between the first transmission member 120 and the first shaft 132 to rotatably support the first transmission member 120 relative to the first shaft 132. The intermediate cogwheel 133 is rotatable relative to the first shaft 132 about the first axis A51. The intermediate cogwheel 133 is secured to the intermediate support body 134. The intermediate support body 134 is rotatably mounted on the first shaft 132. The intermediate bearing assemblies 134A and 134B are provided between the intermediate support body 134 and the first shaft 132 to rotatably support the intermediate support body 134 relative to the first shaft 132. Both axial ends of the first shaft 132 is respectively coupled to the first transmission frame 123A and the second transmission frame 123B.

As seen in FIGS. 14 and 15, the intermediate cogwheel 133 is coupled to the input cogwheel 131 via the input coupling member 130. The input coupling member 130 is configured to couple the input cogwheel 131 to the intermediate cogwheel 133 to transmit rotation of the crank axle B73 to the first transmission member 120.

The input cogwheel 131 comprises a sprocket including teeth. The intermediate cogwheel 133 comprises a sprocket including teeth. The crank axle B73 is configured to be coupled to the first transmission member 120 via the input cogwheel 131, the input coupling member 130, and the intermediate cogwheel 133 to rotate with the first transmission member 120 relative to the transmission frame 123.

As seen in FIG. 16, the intermediate cogwheel 133 is coupled to the first transmission member 120 to rotate together with the first transmission member 120 relative to the transmission frame 123 about the first axis A51. In this embodiment, the transmission apparatus B81 further comprises a side bearing 135. The side bearing 135 is configured to transmit a first rotation R1 (FIG. 14) of the crank axle B73 to the first transmission member 120 and is configured to transmit a second rotation R2 (FIG. 14) of the crank axle B73. As seen in FIG. 14, the second rotation R2 is opposite to the first rotation R1 about the crank rotational axis CA1.

The side bearing 135 is configured to couple the input cogwheel 131 to the first transmission member 120 and is provided between the input cogwheel 131 and the first transmission member 120. Specifically, the side bearing 135 is provided between the first transmission member 120 and the intermediate cogwheel 133. The side bearing 135 is provided between the first transmission member 120 and the intermediate support body 134 to movably support the first transmission member 120 in the axial direction D1 relative to the first shaft 132. The side bearing 135 permits the relative movement between the first transmission member 120 and the intermediate cogwheel 133 in the axial direction D1. The side bearing 135 can have a function of a one way clutch which is configured to transmit a first rotation R1 (FIG. 14) of the crank axle B73 to the first transmission member 120 and is configured to prevent a second rotation R2 (FIG. 14) of the crank axle B73 from being transmitted from the crank axle B73 to the first transmission member 120. The one-way clutch can be provided at other positions or can be omitted from the transmission apparatus B81 if needed and/or desired.

As seen in FIGS. 12 and 13, the transmission apparatus B81 further comprises an output shaft 136. The output shaft 136 is rotatable relative to the transmission frame 123 about the second axis A52. The second transmission member 122 is coupled to the output shaft 136 to rotate together with the output shaft 136 relative to the transmission frame 123 about the second axis A52. The transmission apparatus B81 further comprises output bearing assemblies 137. The output shaft 136 is rotatably mounted to the transmission frame 123 via the output bearing assemblies 137.

The output member B81B is configured to be coupled to the output shaft 136 to rotate together with the output shaft 136 relative to the housing B81A about the second axis A52. Namely, the second transmission member 122, the output shaft 136, and the output member B81B are rotatable integrally with each other relative to the housing B81A about the second axis A52. The output member B81B comprises a sprocket including teeth. The pedaling force is transmitted from the crank axle B73 to the output member B81B via the input cogwheel 131, the input coupling member 130, the intermediate cogwheel 133, the first transmission member 120, the first coupling member 124, the second transmission member 122, and the output shaft 136.

Figure 17:
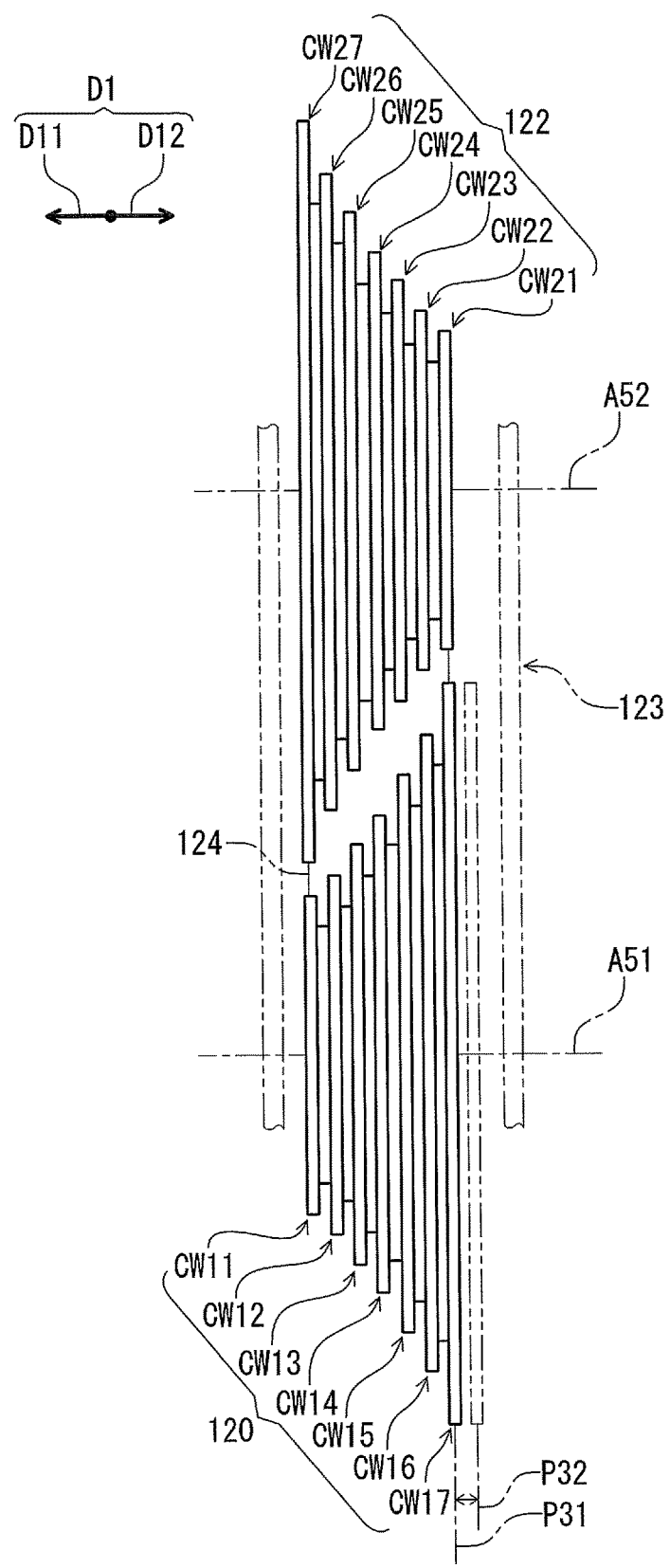
FIG. 17 is a plan view of a first transmission member and a second transmission member of the transmission apparatus illustrated in FIG. 1.

As seen in FIG. 17, the first transmission member 120 is movable relative to the housing B81A in the axial direction D1 parallel to the first axis A51. The second transmission member 122 is stationary relative to the housing B81A in the axial direction D1. In this embodiment, the first transmission member 120 is movable relative to the housing B81A and the second transmission member 122 between a first axial position P31 and a second axial position P32 in the axial direction D1.

The variable speed stage of the transmission apparatus B81 is variable in accordance with at least one positional relationship among the first transmission member 120, the second transmission member 122, and the first coupling member 124 in the axial direction D1. The axial direction D1 includes a first axial direction D11 and a second axial direction D12 opposite to the first axial direction D11.

The first transmission member 120 includes the first cogwheels CW11 to CW17 arranged in the axial direction D1. Each of the first cogwheels CW11 to CW17 comprises a sprocket wheel. Each of the first cogwheels CW11 to CW17 is engageable with the first coupling member 124. The second transmission member 122 includes second cogwheels CW21 to CW27 arranged in the axial direction D1. Each of the second cogwheels CW21 to CW27 comprises a sprocket wheel. Each of the second cogwheels CW21 to CW27 is engageable with the first coupling member 124. The first cogwheels CW11 to CW17 respectively define the speed stages together with the second cogwheels CW21 to CW27. The second cogwheels CW21 to CW27 respectively define the speed stages together with the first cogwheels CW11 to CW17.

A total number of the first cogwheels CW11 to CW17 is equal to a total number of the second cogwheels CW21 to CW27. In this embodiment, the first transmission member 120 includes seven first cogwheels CW11 to CW17 arranged in the axial direction D1. The second transmission member 122 includes seven second cogwheels CW21 to CW27 arranged in the axial direction D1. A total number of the first cogwheels CW11 to CW17 can be different from a total number of the second cogwheels CW21 to CW27 if needed and/or desired.

In this embodiment, the first cogwheels CW11 to CW17 are arranged in the axial direction D1 at a regular interval. The second cogwheels CW21 to CW27 are arranged in the axial direction D1 at a regular interval equal to the regular interval of the first cogwheels CW11 to CW17.

The first cogwheel CW17 is disposed at an axial position substantially equal to an axial position of the second cogwheel CW21 in a first state where the first transmission member 120 is positioned at the first axial position P31. The first cogwheel CW16 is disposed at an axial position substantially equal to the axial position of the second cogwheel CW21 in a second state where the first transmission member 120 is positioned at the second axial position P32. The first cogwheels CW11 to CW17 are respectively disposed at axial positions equal to axial positions of the second cogwheels CW27 to CW21 in the first state of the first transmission member 120. The first cogwheels CW11 to CW 16 are respectively disposed at axial positions equal to axial positions of the second cogwheels CW26 to CW21 in the second state of the first transmission member 120.

Figure 18:
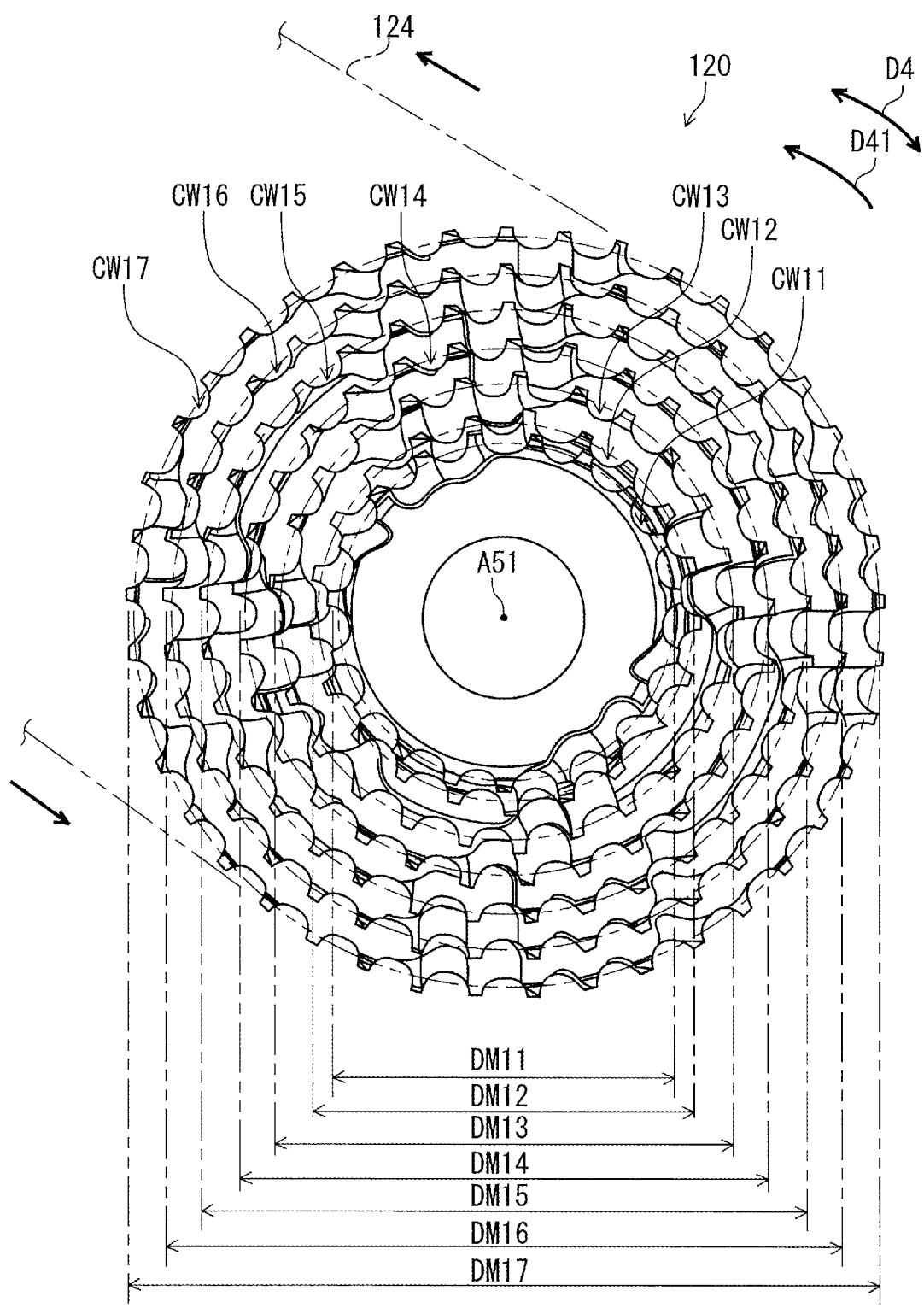
FIG. 18 is a side elevational view of a first transmission member of the transmission apparatus illustrated in FIG. 1.

As seen in FIG. 18, the first cogwheels CW11 to CW17 has different outer diameters and include a first largest cogwheel CW17 and a first smallest cogwheel CW11. The first smallest cogwheel CW11 has an outer diameter smaller than an outer diameter of the first largest cogwheel CW17. The first largest cogwheel CW17 has a largest outer diameter among the first cogwheels CW11 to CW17. The first smallest cogwheel CW11 has a smallest outer diameter among the first cogwheels CW11 to CW17. As seen in FIG. 17, the first smallest cogwheel CW11 is spaced apart from the first largest cogwheel CW17 in the first axial direction D11.

Figure 19:
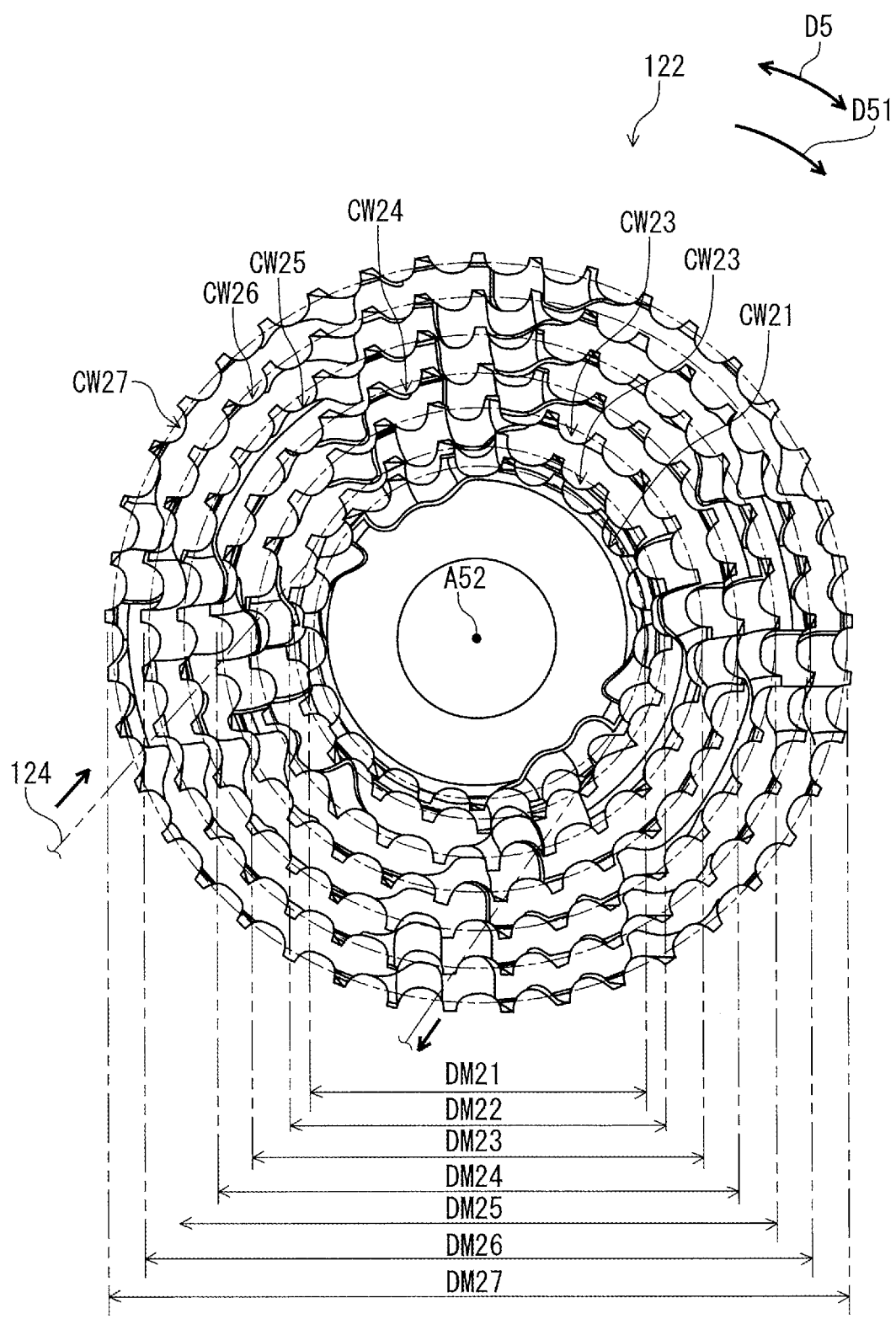
FIG. 19 is a side elevational view of a second transmission member of the transmission apparatus illustrated in FIG. 1.

As seen in FIG. 19, the second cogwheels CW21 to CW27 has different outer diameters and include a second largest cogwheel CW27 and a second smallest cogwheel CW21. The second smallest cogwheel CW21 has an outer diameter smaller than an outer diameter of the second largest cogwheel CW27. The second largest cogwheel CW27 has a largest outer diameter among the second cogwheels CW21 to CW27. The second smallest cogwheel CW21 has a smallest outer diameter among the second cogwheels CW21 to CW27. As seen in FIG. 17, the second smallest cogwheel CW21 is spaced apart from the second largest cogwheel CW27 in the second axial direction D12. In this embodiment, a total number of the first cogwheels CW11 to CW17 is equal to a total number of the second cogwheels CW21 to CW27. However, the total number of the first cogwheels CW11 to CW17 can be different from the total number of the second cogwheels CW21 to CW27.

As seen in FIG. 18, each of the first cogwheels CW11 to CW17 includes first teeth 42 arranged in a circumferential direction D4 of the first transmission member 120. The first cogwheels CW11 to CW17 respectively have first pitch circles each defined by the first teeth 42. The first transmission member 120 rotates about the first axis A51 in a driving rotational direction D41 during pedaling.

As seen in FIG. 19, each of the second cogwheels CW21 to CW27 includes second teeth 44 arranged in a circumferential direction D5 of the second transmission member 122. The second cogwheels CW21 to CW27 respectively have second pitch circles each defined by the second teeth 44. The second transmission member 122 rotates about the second axis A52 in a driving rotational direction D51 during pedaling.

As seen in FIGS. 18 and 19, first diameters DM11 to DM17 of the first pitch circles respectively are equal to second diameters DM21 to DM27 of the second pitch circles. Namely, the second cogwheels CW21 to CW27 respectively have substantially the same constructions as constructions of the first cogwheels CW11 to CW17. However, the second cogwheels CW21 to CW27 can respectively have different constructions from the constructions of the first cogwheels CW11 to CW17 if needed and/or desired.

As seen in FIG. 18, the first transmission member 120 includes a first shifting facilitation part configured to facilitate shifting the first coupling member 124 relative to the first transmission member 120 in the axial direction D1. In this embodiment, at least one of the first cogwheels CW11 to CW17 of the first transmission member 120 includes a first shifting facilitation part 46 configured to facilitate shifting the first coupling member 124 relative to the first transmission member 120 in the axial direction D1. Each of the first cogwheels CW12 to CW17 includes the first shifting facilitation parts 46. The first shifting facilitation parts 46 are recessed in the axial direction D1 to guide the first coupling member 124 from a currently engaged cogwheel to an adjacent larger cogwheel in the first cogwheels CW11 to CW17 when changing a speed stage.

As seen in FIG. 19, the second transmission member 122 includes a second shifting facilitation part configured to facilitate shifting the first coupling member 124 relative to the second transmission member 122 in the axial direction D1. In this embodiment, at least one of the second cogwheels CW21 to CW27 of the second transmission member 122 includes a second shifting facilitation part 50 configured to facilitate shifting the first coupling member 124 relative to the second transmission member 122 in the axial direction D1. Each of the second cogwheels CW22 to CW27 includes the second shifting facilitation parts 50. The second shifting facilitation parts 50 are recessed in the axial direction D1 to guide the first coupling member 124 from a currently engaged cogwheel to an adjacent larger cogwheel in the second cogwheels CW22 to CW27 when changing a speed stage.

As seen in FIG. 16, the transmission apparatus B81 further comprises a sliding structure 152. The sliding structure 152 is configured to movably couple the first transmission member 120 to the first shaft 132 in the axial direction D1.

Figure 20:
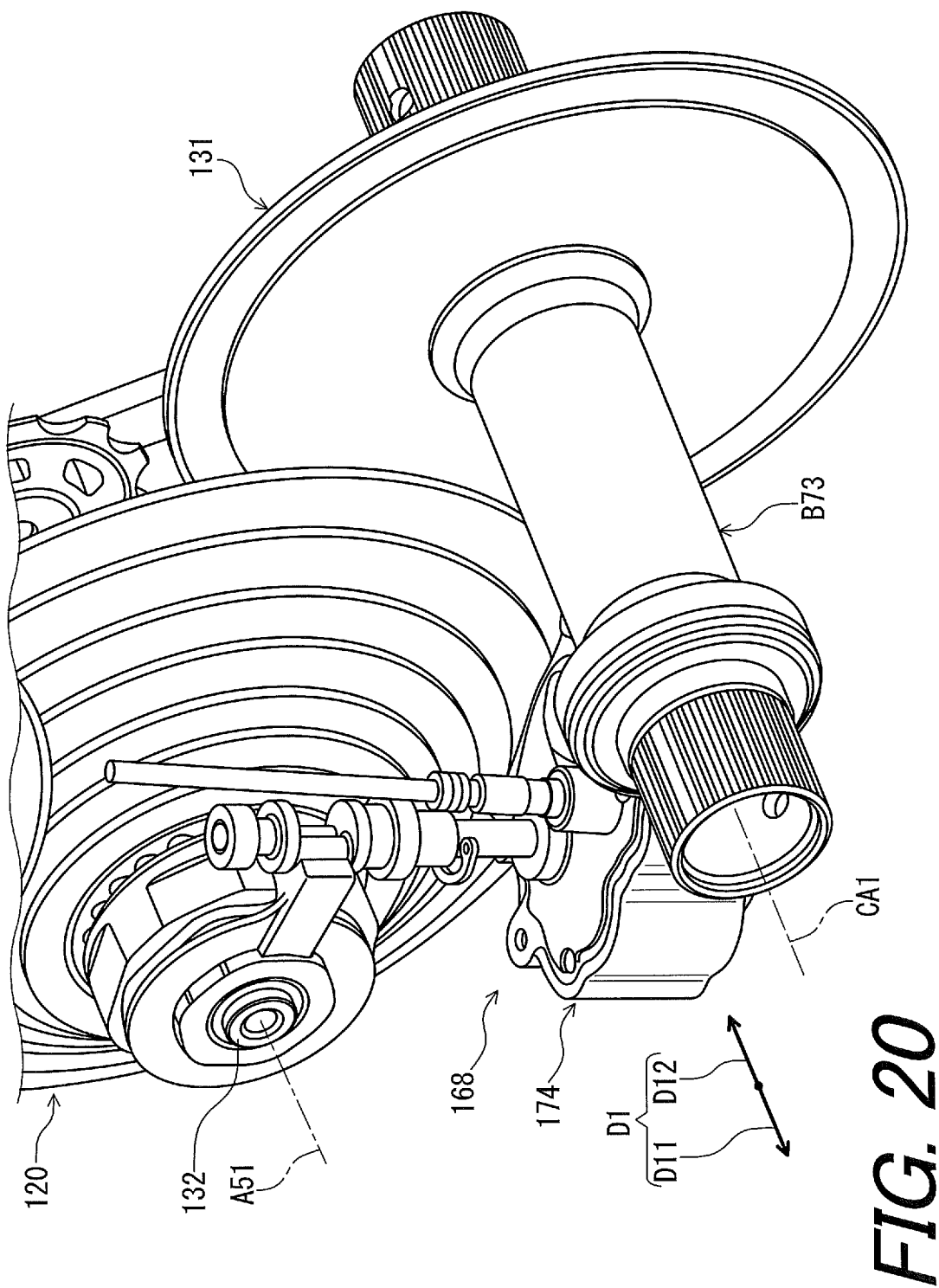
FIG. 20 is a perspective view of the transmission apparatus illustrated in FIG. 1.
Figure 21:
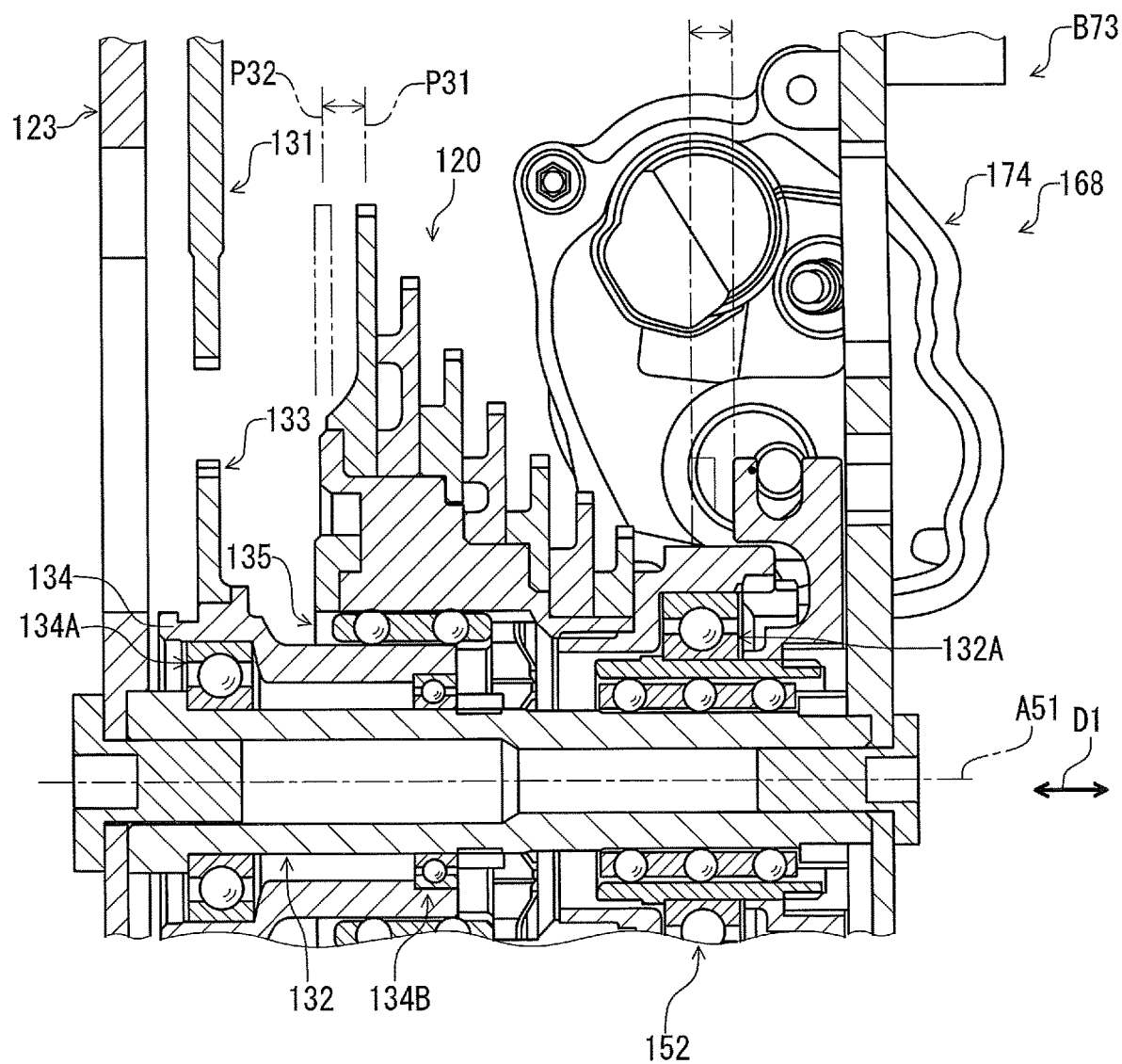
FIG. 21 is a cross-sectional view of the transmission apparatus taken along line XXI-XXI of FIG. 14.

As seen in FIGS. 20 and 21, the transmission apparatus B81 further comprises a switching device 168 configured to switch a position of the first transmission member 120 relative to the housing B81A in the axial direction D1 between the first axial position P31 and the second axial position P32. In this embodiment, the switching device 168 includes a switching actuator 174. The switching actuator 174 is configured to generate an actuating force to move the first transmission member 120 relative to the housing B81A in the axial direction D1. In this embodiment, the switching actuator 174 includes a motor and a speed reducer. Other structures can be applied to the switching device 168. For example, it is possible to directly move the first transmission member 120 relative to the housing B81A using structures such as gears, worm gear, ruck gear and/or cams if needed and/or desired.

Figure 22:
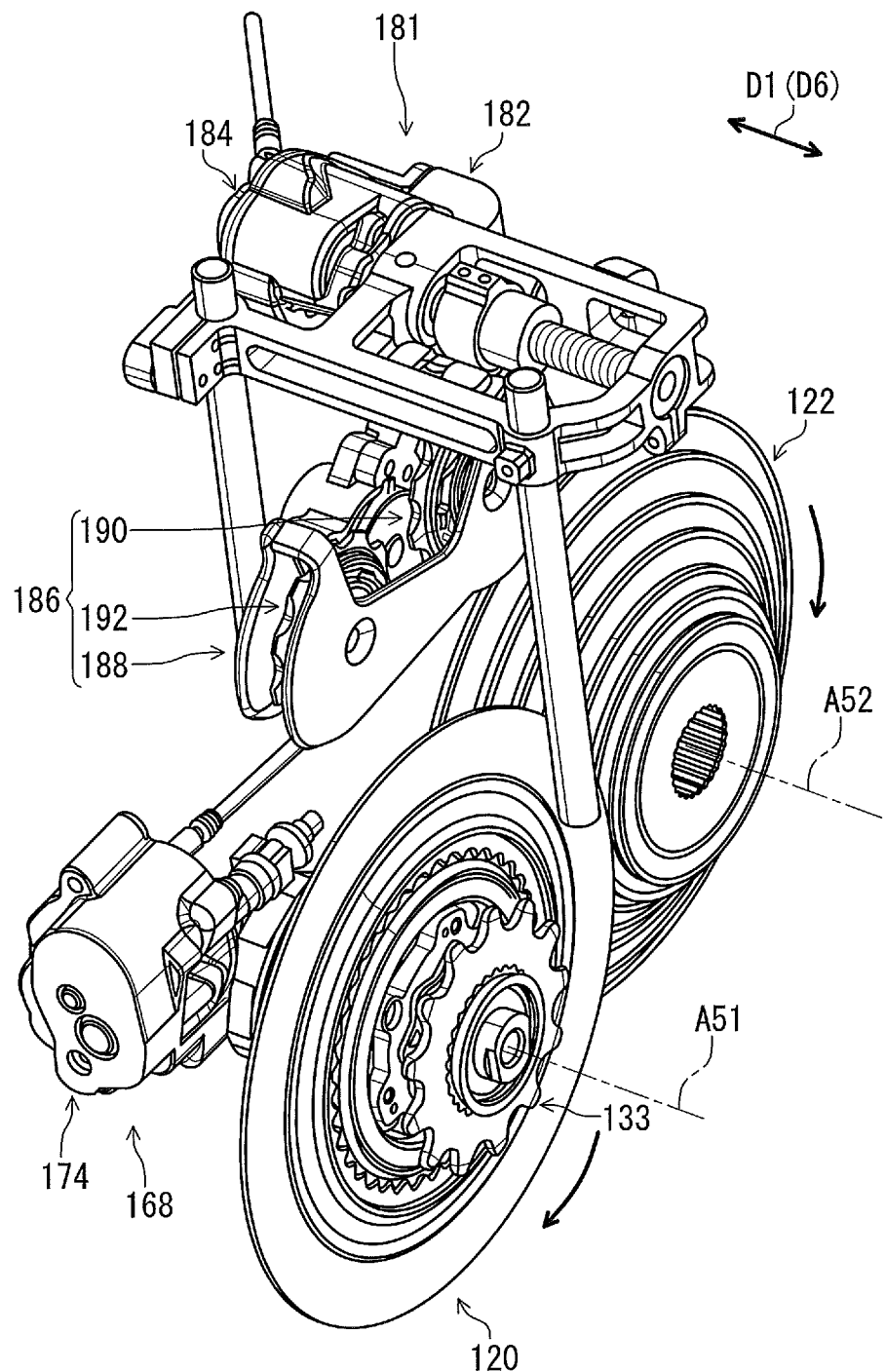
FIG. 22 is a perspective view of the transmission apparatus illustrated in FIG. 1.
Figure 23:
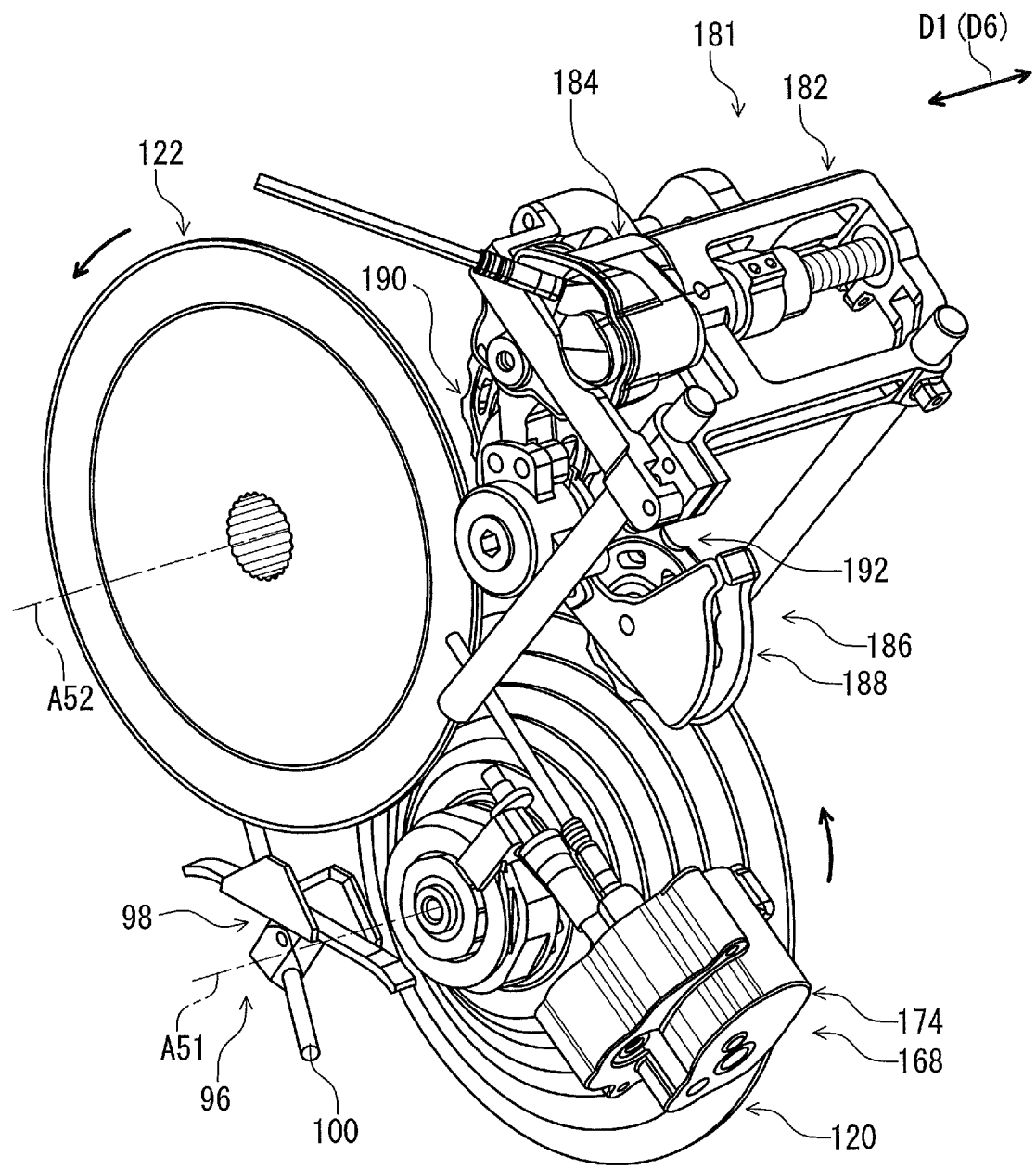
FIG. 23 is a perspective view of the transmission apparatus illustrated in FIG. 1.

As seen in FIGS. 22 and 23, the transmission apparatus B81 further comprises a first guide structure 181. The first guide structure 181 is configured to guide the first coupling member 124 relative to the housing B81A in a guide direction D6 intersecting with a plane perpendicular to the axial direction D1. In this embodiment, the guide direction D6 is parallel to the axial direction D1. The first guide structure 181 includes a guide frame 182, a guide actuator 184, and a first guide element 186. The guide frame 182 is secured to the housing B81A (FIG. 4). The guide actuator 184 is mounted to the guide frame 182. The guide actuator 184 moves the first guide element 186 relative to the housing B81A (FIG. 4) in the guide direction D6. The first guide element 186 is engaged with the first coupling member 124. The guide actuator 184 shifts the first coupling member 124 relative to the housing B81A (FIG. 4) in the axial direction D1 with a ball screw structure.

The first guide element 186 includes a coupling support 188, a first guide pulley 190, and a second guide pulley 192. The guide actuator 184 moves the coupling support 188 relative to the housing B81A (FIG. 4) in the guide direction D6. The first guide pulley 190 is rotatably attached to the coupling support 188. The second guide pulley 192 is rotatably attached to the coupling support 188. The first guide pulley 190 and the second guide pulley 192 are engaged with the first coupling member 124 to adjust tension of the first coupling member 124. The first guide pulley 190 and the second guide pulley 192 hold the first coupling member 124 relative to the coupling support 188 in the guide direction D6 (the axial direction D1).

Figure 24:
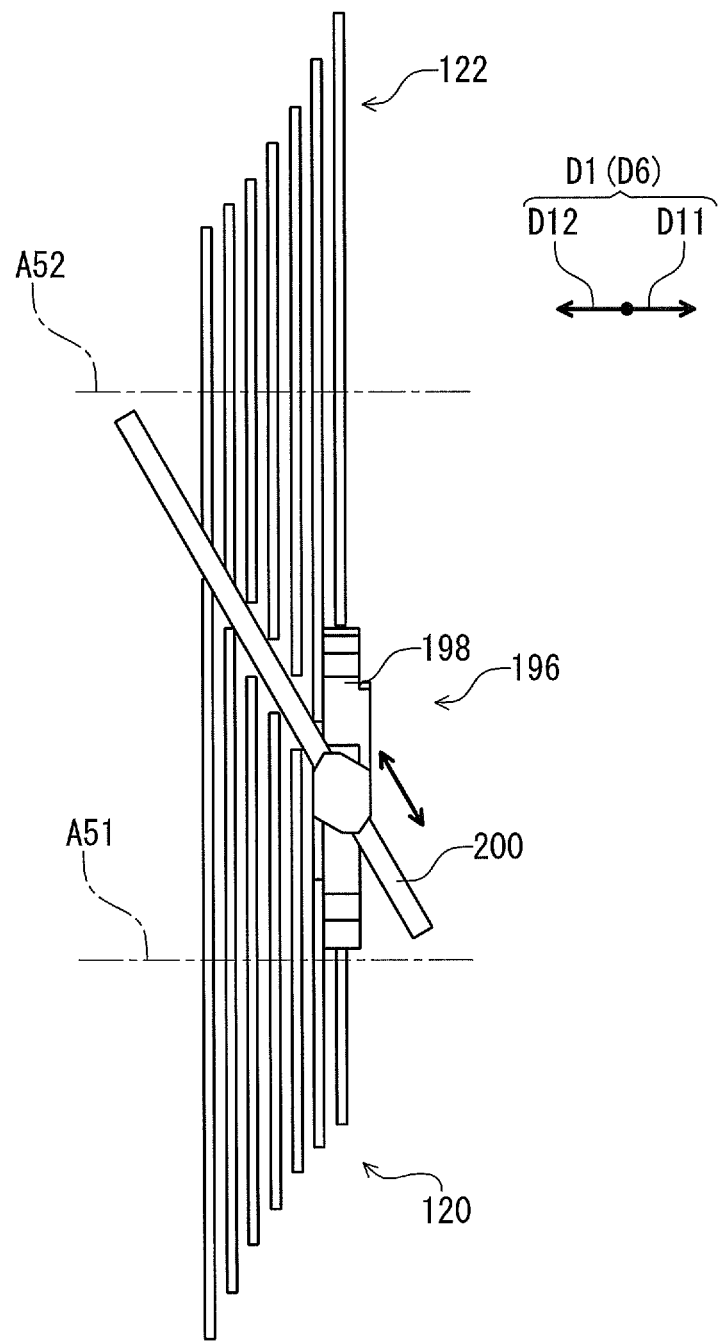
FIG. 24 is a bottom view of the first transmission member, the second transmission member, and a second guide structure of the transmission apparatus illustrated in FIG. 1.

As seen in FIGS. 14, 23 and 24, the transmission apparatus B81 further comprises a second guide structure 196 to guide the first coupling member 124 between the first transmission member 120 and the second transmission member 122. The second guide structure 196 includes a second guide member 198 contactable with the first coupling member 124. The second guide structure 196 includes a guide support 200 to slidably support the second guide member 198 to apply a sliding resistance to the second guide member 198. The guide support 200 is secured to the housing B81A (FIG. 4). The second guide member 198 moves relative to the guide support 200 in response to a pushing force F11 applied from the first coupling member 124 to the second guide member 198 beyond the sliding resistance.

Figure 25:
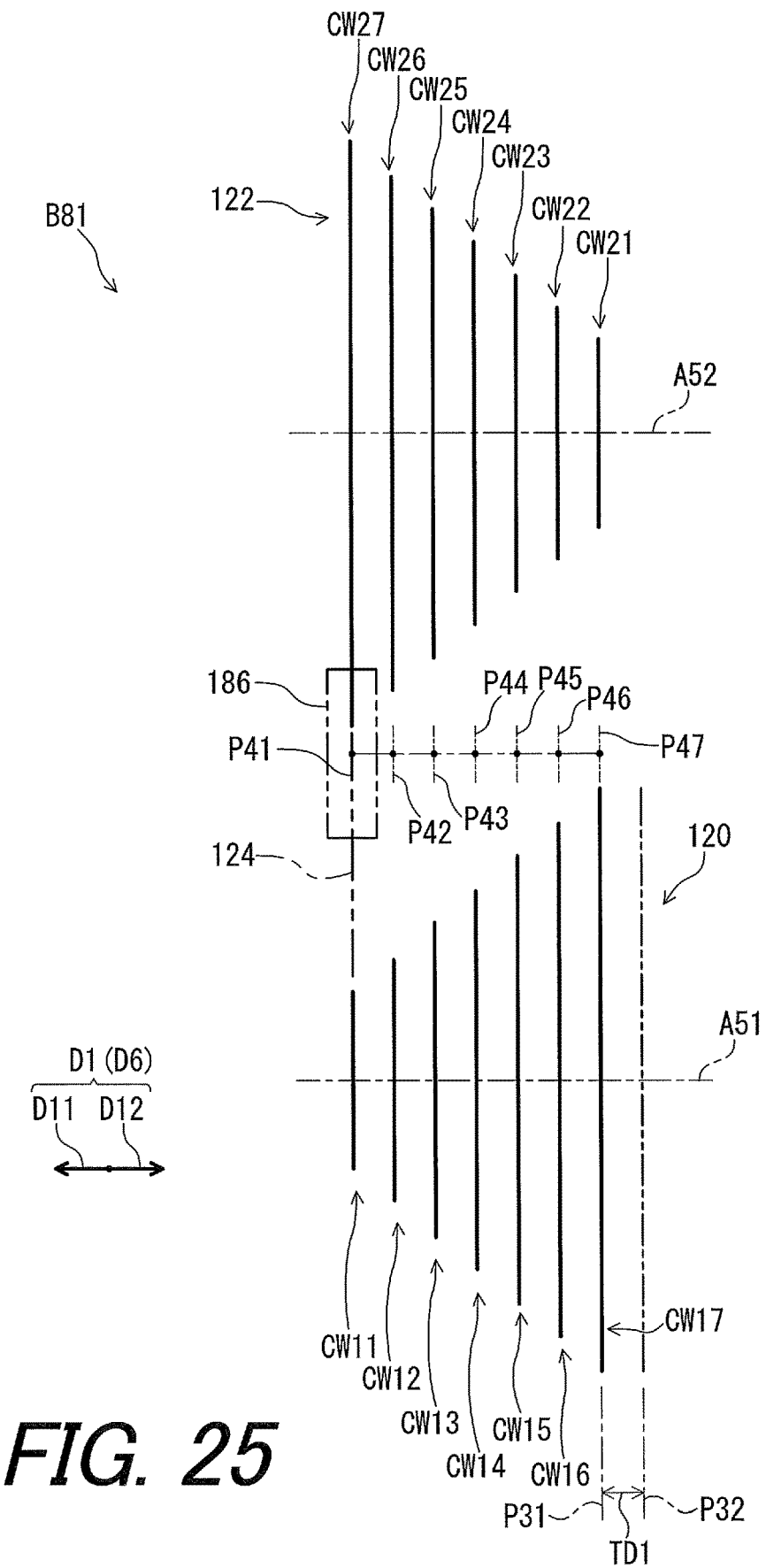
FIG. 25 is a schematic diagram showing an arrangement of the first transmission member, the second transmission member, and a first guide structure of the transmission apparatus illustrated in FIG. 1.

As seen in FIG. 25, the first guide structure 181 is configured to move and position the first guide element 186 between first to seventh guide positions P41 to P47 in the guide direction D6. The first to seventh guide positions P41 to P47 respectively correspond to axial positions of the second cogwheels CW27 to CW21.

The first largest cogwheel CW17 is provided at an end of the first cogwheels CW11 to CW17 in the first axial direction D11. The second largest cogwheel CW27 is provided at an end of the second cogwheels CW21 to CW27 in the second axial direction D12. The first smallest cogwheel CW11 is provided at an end of the first cogwheels CW11 to CW17 in the second axial direction D12. The second smallest cogwheel CW21 is provided at an end of the second cogwheels CW21 to CW27 in the first axial direction D11. The first axial direction D11 is a direction in which the first largest cogwheel CW17 moves toward the second largest cogwheel CW27. The second axial direction D12 is a direction in which the first largest cogwheel CW17 moves away from the second largest cogwheel CW27.

Figure 26:
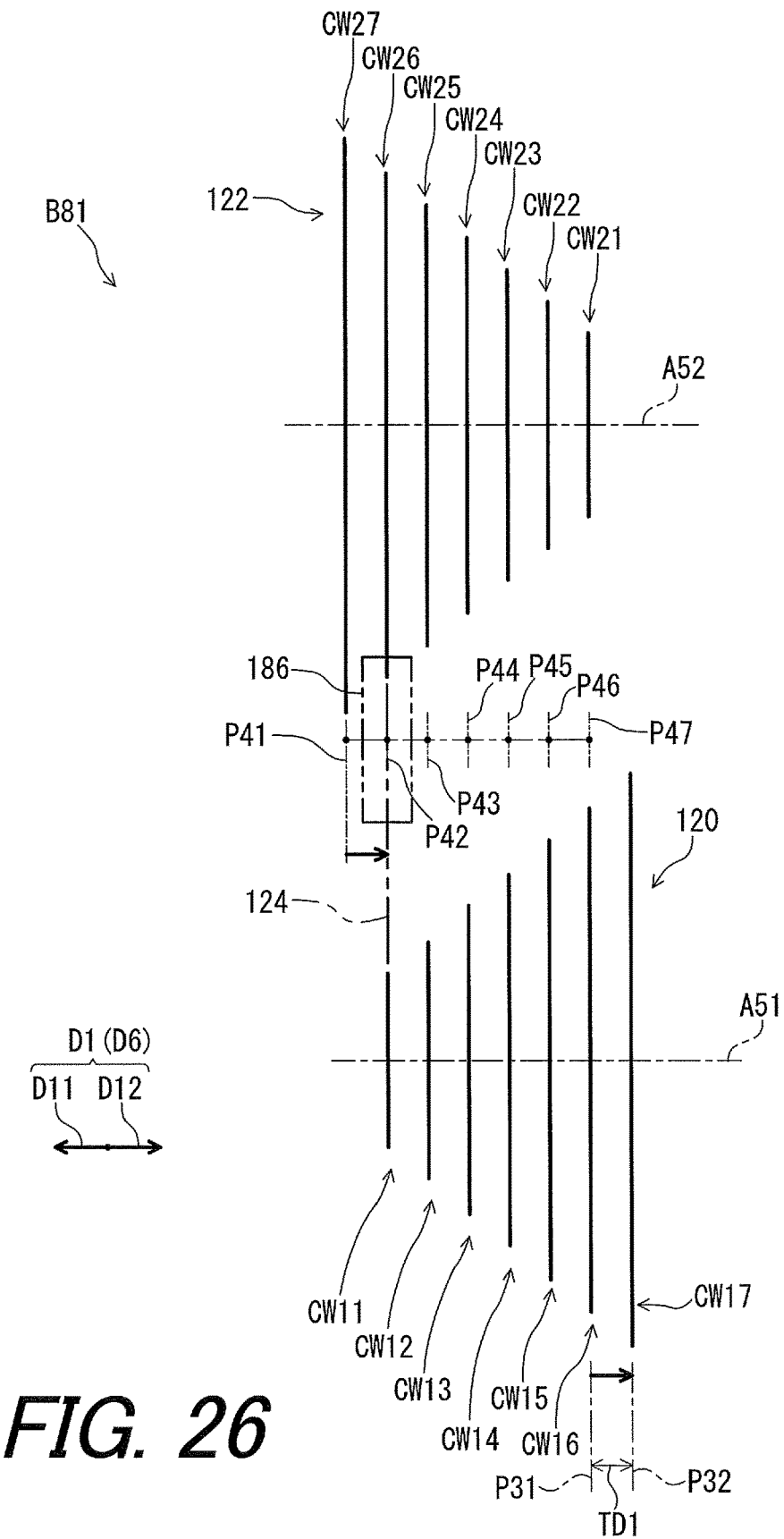
FIG. 26 is a schematic diagram showing an arrangement of the first transmission member, the second transmission member, and a first guide structure of the transmission apparatus illustrated in FIG. 1.
Figure 27:
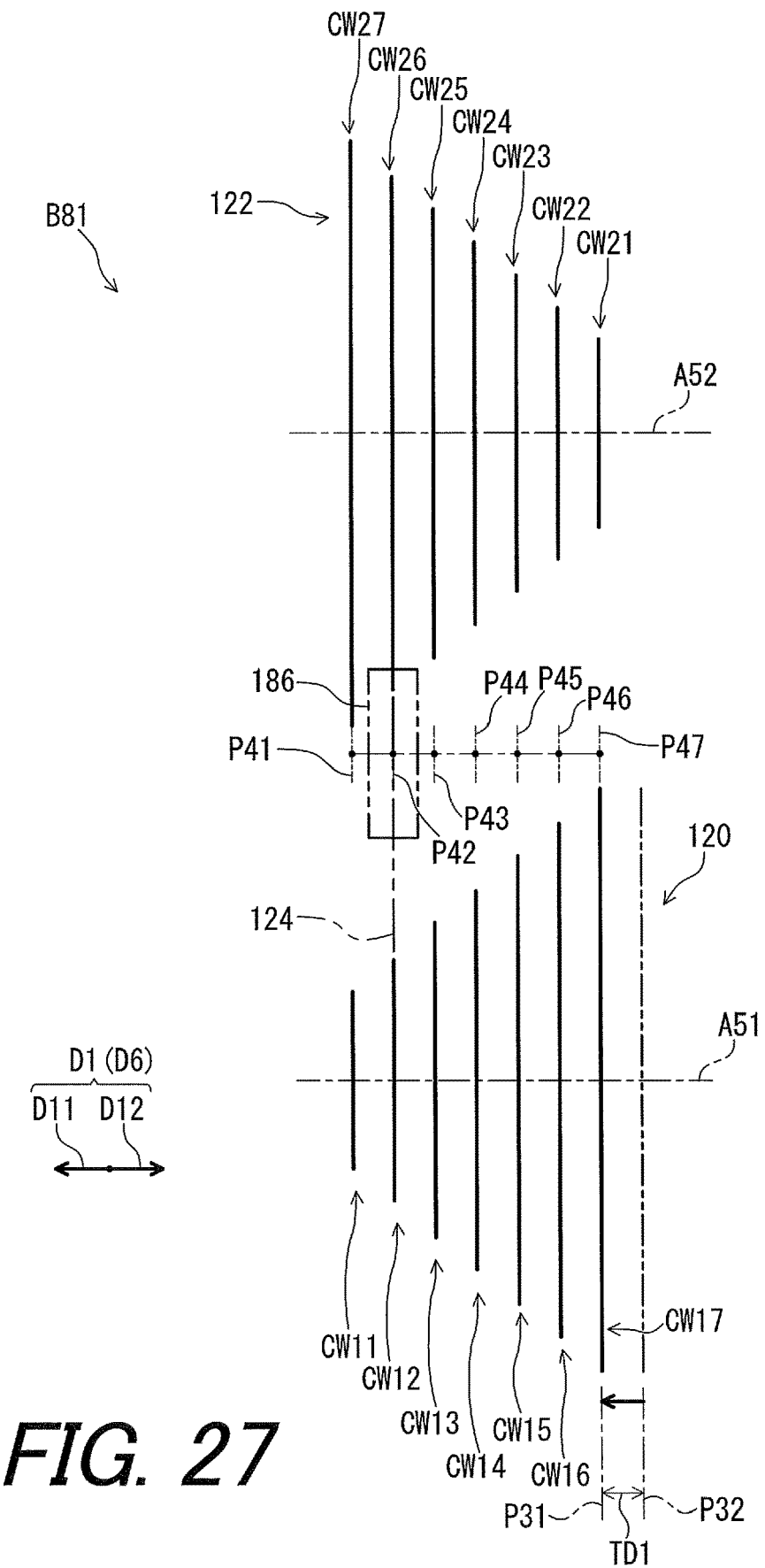
FIG. 27 is a schematic diagram showing an arrangement of the first transmission member, the second transmission member, and a first guide member of the transmission apparatus illustrated in FIG. 1.

As seen in FIGS. 25 to 27, the first coupling member 124 has a first engagement state where the first coupling member 124 is engaged with one of the first cogwheels CW11 to CW17 and a second engagement state where the first coupling member 124 is engaged with one of the second cogwheels CW21 to CW27. The first engagement state changes when the first coupling member 124 moves from one of the first cogwheels CW11 to CW17 to another of the first cogwheels CW11 to CW17. The second engagement state changes when the first coupling member 124 moves from one of the second cogwheels CW21 to CW27 to another of the second cogwheels CW21 to CW27. The first transmission member 120 moves relative to the second transmission member 122 in the axial direction D1 by a travel distance TD1 defined between the first axial position P31 and the second axial position P32 to change the first engagement state of the first coupling member 124 from one cogwheel to another adjacent cogwheel among the first cogwheels CW11 to CW17. The travel distance TD1 is equal to the regular interval of the first cogwheels CW11 to CW17.

As seen in FIGS. 25 and 26, the first transmission member 120 is movable together with the first coupling member 124 relative to the housing B81A in the second axial direction D12 so as to change the axial relative position between the first coupling member 124 and the second transmission member 122 during the one of upshifting and downshifting. The first transmission member 120 is movable together with the first coupling member 124 relative to the housing B81A in the second axial direction D12 without changing the axial relative position between the first coupling member 124 and the first transmission member 120 during the one of upshifting and downshifting.

In this embodiment, the first transmission member 120 is movable together with the first coupling member 124 relative to the housing B81A in the second axial direction D12 so as to change the axial relative position between the first coupling member 124 and the second transmission member 122 during upshifting (from FIG. 25 to FIG. 26). The first transmission member 120 is movable together with the first coupling member 124 relative to the housing B81A in the second axial direction D12 without changing the axial relative position between the first coupling member 124 and the first transmission member 120 during upshifting (from FIG. 25 to FIG. 26).

As seen in FIGS. 26 and 27, the first transmission member 120 is movable relative to the housing B81A and the first coupling member 124 in the first axial direction D11 without changing an axial relative position between the first coupling member 124 and the second transmission member 122 during one of upshifting and downshifting. The first transmission member 120 is movable relative to the housing B81A and the first coupling member 124 in the first axial direction D11 so as to change an axial relative position between the first coupling member 124 and the first transmission member 120 during the one of upshifting and downshifting.

In this embodiment, the first transmission member 120 is movable relative to the housing B81A and the first coupling member 124 in the first axial direction D11 without changing an axial relative position between the first coupling member 124 and the second transmission member 122 during upshifting (from FIG. 26 to FIG. 27). The first transmission member 120 is movable relative to the housing B81A and the first coupling member 124 in the first axial direction D11 so as to change an axial relative position between the first coupling member 124 and the first transmission member 120 during upshifting (from FIG. 26 to FIG. 27).

Furthermore, as seen in FIGS. 26 and 27, the first transmission member 120 is movable relative to the housing B81A and the first coupling member 124 in the second axial direction D12 without changing the axial relative position between the first coupling member 124 and the second transmission member 122 during another of upshifting and downshifting. The first transmission member 120 is movable relative to the housing B81A and the first coupling member 124 in the second axial direction D12 so as to change the axial relative position between the first coupling member 124 and the first transmission member 120 during said another of upshifting and downshifting.

In this embodiment, the first transmission member 120 is movable relative to the housing B81A and the first coupling member 124 in the second axial direction D12 without changing the axial relative position between the first coupling member 124 and the second transmission member 122 during downshifting (from FIG. 27 to FIG. 26). The first transmission member 120 is movable relative to the housing B81A and the first coupling member 124 in the second axial direction D12 so as to change the axial relative position between the first coupling member 124 and the first transmission member 120 during downshifting (from FIG. 27 to FIG. 26).

Furthermore, as seen in FIGS. 25 and 26, the first transmission member 120 is movable together with the first coupling member 124 relative to the housing B81A in the first axial direction D11 so as to change the axial relative position between the first coupling member 124 and the second transmission member 122 during said another of upshifting and downshifting. The first transmission member 120 is movable together with the first coupling member 124 relative to the housing B81A in the first axial direction D11 without changing the axial relative position between the first coupling member 124 and the first transmission member 120 during said another of upshifting and downshifting.

In this embodiment, the first transmission member 120 is movable together with the first coupling member 124 relative to the housing B81A in the first axial direction D11 so as to change the axial relative position between the first coupling member 124 and the second transmission member 122 during downshifting (from FIG. 26 to FIG. 25). The first transmission member 120 is movable together with the first coupling member 124 relative to the housing B81A in the first axial direction D11 without changing the axial relative position between the first coupling member 124 and the first transmission member 120 during downshifting (from FIG. 26 to FIG. 25).

As seen in FIGS. 25 and 26, the first transmission member 120 is movable together with the first coupling member 124 and the first guide element 186 relative to the housing B81A in the second axial direction D12 so as to change the axial relative position between the first coupling member 124 and the second transmission member 122 during the one of upshifting and downshifting. In this embodiment, the first transmission member 120 is movable together with the first coupling member 124 and the first guide element 186 relative to the housing B81A in the second axial direction D12 so as to change the axial relative position between the first coupling member 124 and the second transmission member 122 during upshifting (from FIG. 25 to FIG. 26). The guide actuator 184 moves the first guide element 186 from a first guide position P41 to a second guide position P42 in the guide direction D6 when the switching actuator 174 moves the first transmission member 120 relative to the housing B81A from the first axial position P31 to the second axial position P32 in the second axial direction D12.

As seen in FIGS. 26 and 27, the first transmission member 120 is movable relative to the housing B81A, the first coupling member 124, and the first guide element 186 in the first axial direction D11 so as to change the axial relative position between the first coupling member 124 and the first transmission member 120 during the one of upshifting and downshifting. In this embodiment, the first transmission member 120 is movable relative to the housing B81A, the first coupling member 124, and the first guide element 186 in the first axial direction D11 so as to change the axial relative position between the first coupling member 124 and the first transmission member 120 during upshifting (from FIG. 26 to FIG. 27). The guide actuator 184 positions the first guide element 186 at the second guide position P42 to keep the axial position of the first coupling member 124 relative to the second transmission member 122 in the axial direction D1 when the switching actuator 174 moves the first transmission member 120 relative to the housing B81A from the second axial position P32 to the first axial position P31 in the first axial direction D11.

As seen in FIGS. 26 and 27, the first transmission member 120 is movable relative to the housing B81A, the first coupling member 124, and the first guide element 186 in the second axial direction D12 so as to change the axial relative position between the first coupling member 124 and the first transmission member 120 during said another of upshifting and downshifting. In this embodiment, the first transmission member 120 is movable relative to the housing B81A, the first coupling member 124, and the first guide element 186 in the second axial direction D12 so as to change the axial relative position between the first coupling member 124 and the first transmission member 120 during downshifting (from FIG. 27 to FIG. 26). The guide actuator 184 positions the first guide element 186 at the second guide position P42 to keep the axial position of the first coupling member 124 relative to the second transmission member 122 in the axial direction D1 when the switching actuator 174 moves the first transmission member 120 relative to the housing B81A from the first axial position P31 to the second axial position P32 in the second axial direction D12.

As seen in FIGS. 25 and 26, the first transmission member 120 is movable together with the first coupling member 124 and the first guide element 186 relative to the housing B81A in the first axial direction D11 so as to change the axial relative position between the first coupling member 124 and the second transmission member 122 during said another of upshifting and downshifting. In this embodiment, the first transmission member 120 is movable together with the first coupling member 124 and the first guide element 186 relative to the housing B81A in the first axial direction D11 so as to change the axial relative position between the first coupling member 124 and the second transmission member 122 during downshifting (from FIG. 26 to FIG. 25). The guide actuator 184 moves the first guide element 186 from the second guide position P42 to the first guide position P41 in the guide direction D6 when the switching actuator 174 moves the first transmission member 120 relative to the housing B81A from the second axial position P32 to the first axial position P31 in the first axial direction D11.

The above operation of the first transmission member 120, the first coupling member 124, and the first guide element 186 is applied to a case where the first guide element 186 is positioned at each of the third to seventh guide positions P43 to P47. For example, the first guide element 186 can be positioned at the third guide position P43 in FIGS. 26 and 27 in a case where the first guide element 186 is positioned at the second guide position P42 in FIG. 25.

Figure 28:
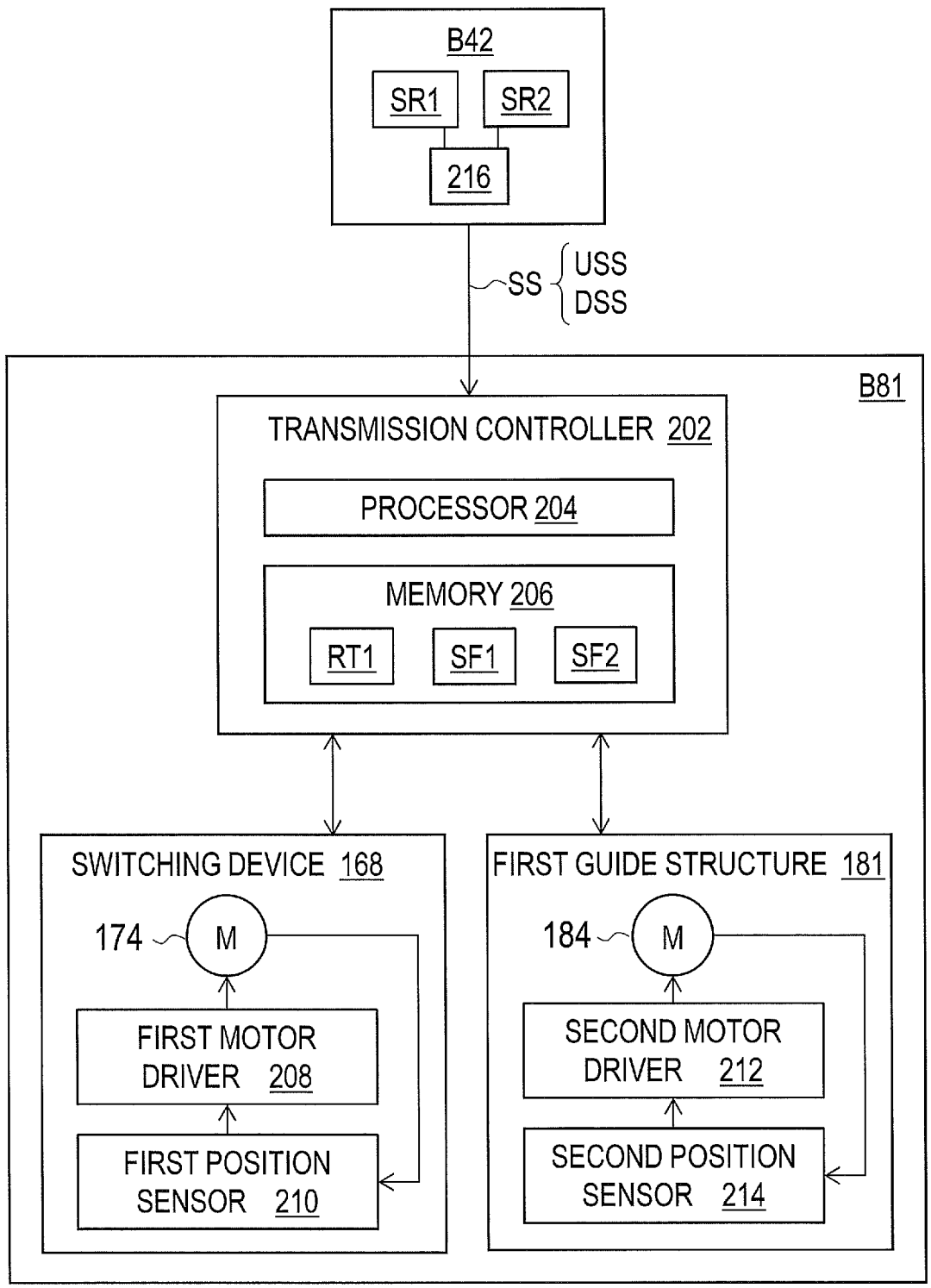
FIG. 28 is a block diagram of the transmission apparatus illustrated in FIG. 1.

As seen in FIG. 28, the transmission apparatus B81 further comprises a transmission controller 202. The transmission controller 202 is configured to control the switching device 168 and the first guide structure 181. Specifically, the transmission controller 202 is configured to control the switching actuator 174 and the guide actuator 184. In this embodiment, the transmission controller 202 is constituted as a microcomputer and includes a processor 204 and a memory 206. The processor 204 includes a central processing unit (CPU). The memory 206 includes a read only memory (ROM) and a random access memory (RAM). For example, a program stored in the memory 206 is read into the processor 204, and thereby several functions of the transmission controller 202 are performed. The transmission controller 202, the switching device 168, and the first guide structure 181 are powered by a battery (e.g. a rechargeable battery) which is mounted on the bicycle body B3 or the transmission apparatus B81.

While the functions of the transmission controller 202 are performed by software, the functions of the transmission controller 202 can be performed by hardware or by a combination of the software and the hardware if needed and/or desired.

The transmission controller 202 is configured to store a transmission route RT1 (FIG. 29) in the memory 206. FIG. 29 shows a total number of the first teeth 42 in each of the first cogwheels CW11 to CW17, a total number of the second teeth 44 in each of the second cogwheels CW21 to CW27, and gear ratios defined by the first cogwheels CW11 to CW17 and the second cogwheels CW21 to CW27. The transmission route RT1 is defined by thirteen gear ratios among the gear ratios defined by the first cogwheels CW11 to CW17 and the second cogwheels CW21 to CW27. Namely, the transmission controller 202 includes a transmission route memory configured to store the transmission route RT1 defined by at least two of the gear ratios defined by the first cogwheels CW11 to CW17 and the second cogwheels CW21 to CW27.

To control the switching device 168 and the first guide structure 181 based on the transmission route RT1 of FIG. 29, as seen in FIGS. 28 and 30, the transmission controller 202 is configured to store shift information SF1 defined based on the transmission route RT1 in the memory 206. As seen in FIG. 30, for example, the shift information SF1 includes combinations of the axial positions of the first transmission member 120 and the positions of the first guide element 186 for the speed stages of the transmission apparatus B81. The transmission controller 202 is further configured to store a current speed stage of the transmission apparatus B81 in the memory 206.

As seen in FIG. 28, the switching device 168 includes a first motor driver 208 and a first position sensor 210. The first motor driver 208 is configured to control the switching actuator 174 based on commands and/or signals from the transmission controller 202. The first position sensor 210 is configured to sense the axial position of the first transmission member 120. In this embodiment, for example, the first position sensor 210 is configured to sense a rotational position of the switching actuator 174 to obtain the axial position of the first transmission member 120. While the first position sensor 210 is a potentiometer configured to sense the rotational position of the switching actuator 174 in this embodiment, the first position sensor 210 can be other sensors such as a rotary encoder, a magnetic sensor, and an optical sensor if needed and/or desired. The transmission controller 202 is configured to store a current axial position of the first transmission member 120 among the first axial position P31 and the second axial position P32 in the memory 206. Namely, the transmission controller 202 includes a first position memory configured to store the current axial position of the first transmission member 120.

The first guide structure 181 includes a second motor driver 212 and a second position sensor 214. The second motor driver 212 is configured to control the guide actuator 184 based on commands and/or signals from the transmission controller 202. The second position sensor 214 is configured to sense the position of the first guide element 186. In this embodiment, the second position sensor 214 is configured to sense a rotational position of the guide actuator 184 and an axial position of the first guide element 186 to obtain the position of the first guide element 186. While the second position sensor 214 is a potentiometer configured to sense the rotational position of the guide actuator 184 in this embodiment, the second position sensor 214 can be other sensors such as a rotary encoder, a magnetic sensor, and an optical sensor. The transmission controller 202 is configured to store a current position of the first guide element 186 in the memory 206. Namely, the transmission controller 202 includes a second position memory configured to store the current position of the first guide element 186.

The right operating device B42 includes a first operating member SR1 and a second operating member SR2. The first operating member SR1 is configured to be operated by a user for upshifting. The second operating member SR2 is configured to be operated by the user for downshifting. The right operating device B42 includes a signal controller 216 configured to generate a shifting signal SS based on input operations of the first operating member SR1 and the second operating member SR2. The signal controller 216 is configured to generate an upshifting signal USS based on an input operation of the first operating member SR1. The signal controller 216 is configured to generate a downshifting signal DSS based on an input operation of the second operating member SR2. The upshifting signal USS and the downshifting signal DSS are inputted from the right operating device B42 to the transmission controller 202. The transmission controller 202 controls the switching actuator 174 and the guide actuator 184 based on the shifting signal SS and the transmission route RT1 (e.g., the shift information SF1) stored in the memory 206.

For example, when the upshifting signal USS is inputted from the right operating device B42 to the transmission controller 202 in a state where the speed stage is in a low gear (e.g., FIG. 25), the transmission controller 202 controls the switching actuator 174 to move the first transmission member 120 from the first axial position P31 to the second axial position P32 in the second axial direction D12 (FIGS. 26 and 30). At this time, as seen in FIGS. 26 and 30, the transmission controller 202 controls the guide actuator 184 to move the first guide element 186 from the first guide position P41 to the second guide position P42. In this embodiment, the first transmission member 120 and the first guide element 186 are substantially simultaneously moved when the first coupling member 124 is shifted on the first transmission member 120. Thus, the first transmission member 120 and the first coupling member 124 are shifted relative to the second transmission member 122 in the second axial direction D12. Accordingly, as seen in FIGS. 26, 29, and 30, the first coupling member 124 is shifted from the second cogwheel CW27 to the second cogwheel CW26, changing the speed stage of the transmission apparatus B81 from low gear to second gear.

Namely, the transmission controller 202 is configured to control the switching device 168 and the first guide structure 181 to move the first transmission member 120 and the first guide element 186 relative to the housing B81A (the second transmission member 122) in the axial direction D1. The transmission controller 202 is configured to control the switching device 168 and the first guide structure 181 so as not to change the first engagement state of the first coupling member 124 from one cogwheel to another adjacent cogwheel among the first cogwheels CW11 to CW17 when the first transmission member 120 moves relative to the housing B81A in association with a movement of the first guide structure 181 relative to the housing B81A to change the second engagement state of the first coupling member 124 from one cogwheel to another adjacent cogwheel among the second cogwheels CW21 to CW27.

When the upshifting signal USS is inputted from the right operating device B42 to the transmission controller 202 in a state where the speed stage is in second gear (FIG. 26), the transmission controller 202 controls the switching actuator 174 to move the first transmission member 120 from the second axial position P32 to the first axial position P31 in the first axial direction D11 (FIGS. 27 and 30). At this time, as seen in FIGS. 27 and 30, the transmission controller 202 controls the guide actuator 184 to position the first guide element 186 at the second guide position P42. Thus, the first transmission member 120 is shifted relative to the second transmission member 122 and the first coupling member 124 in the first axial direction D11. Accordingly, as seen in FIGS. 26, 29, and 30, the first coupling member 124 is shifted from the first cogwheel CW11 to the first cogwheel CW12, changing the speed stage of the transmission apparatus B81 from second gear to third gear.

Namely, the transmission controller 202 is configured to control the switching device 168 to move the first transmission member 120 relative to the housing B81A (the second transmission member 122) in the axial direction D1 while the transmission controller 202 controls the first guide structure 181 to position the first guide element 186 at the second guide position P42. The transmission controller 202 is configured to control the switching device 168 and the first guide structure 181 so as to change the first engagement state of the first coupling member 124 from one cogwheel to another adjacent cogwheel among the first cogwheels CW11 to CW17 when the first transmission member 120 moves relative to the housing B81A in the axial direction D1.

When the downshifting signal DSS is inputted from the right operating device B42 to the transmission controller 202 in a state where the speed stage is in third gear (FIG. 27), the transmission controller 202 controls the switching actuator 174 to move the first transmission member 120 from the first axial position P31 to the second axial position P32 in the second axial direction D12 (FIGS. 26 and 30). At this time, as seen in FIGS. 26 and 30, the transmission controller 202 controls the guide actuator 184 to position the first guide element 186 at the second guide position P42. Thus, the first transmission member 120 is shifted relative to the second transmission member 122 and the first coupling member 124 in the second axial direction D12. Accordingly, as seen in FIGS. 26, 29, and 30, the first coupling member 124 is shifted from the first cogwheel CW12 to the first cogwheel CW11, changing the speed stage of the transmission apparatus B81 from third gear to second gear.

When the downshifting signal DSS is inputted from the right operating device B42 to the transmission controller 202 in a state where the speed stage is in second gear (FIG. 26), the transmission controller 202 controls the switching actuator 174 to move the first transmission member 120 from the second axial position P32 to the first axial position P31 in the first axial direction D11 (FIGS. 25 and 30). At this time, as seen in FIGS. 25 and 30, the transmission controller 202 controls the guide actuator 184 to move the first guide element 186 from the second guide position P42 to the first guide position P41. Thus, the first transmission member 120 and the first coupling member 124 are shifted relative to the second transmission member 122 in the first axial direction D11. Accordingly, as seen in FIGS. 25, 29, and 30, the first coupling member 124 is shifted from the second cogwheel CW26 to the second cogwheel CW27, changing the speed stage of the transmission apparatus B81 from second gear to low gear.

As described above, since the transmission controller 202 controls the switching device 168 and the first guide structure 181 between low gear and thirteenth gear based on the transmission route RT1 shown in FIG. 29 (e.g., the shift information SF1 shown in FIG. 30), they will not be described and/or illustrated in detail here for the sake of brevity. If the transmission controller 202 and the right operating device B42 are communicated by wireless technology, the transmission controller 202 and the right operating device B42 respectively have wireless communication devices, and the right operating device B42 has another battery.

Second Embodiment

A bicycle tensioner apparatus 312 including a bicycle tensioner 322 in accordance with a second embodiment will be described below referring to FIG. 31. The bicycle tensioner apparatus 312 has the same structure as the bicycle tensioner apparatus 12 except for the arrangement of some elements. Thus, elements having substantially the same function as those in the first embodiment will be numbered the same here, and will not be described and/or illustrated again in detail here for the sake of brevity.

Figure 31:
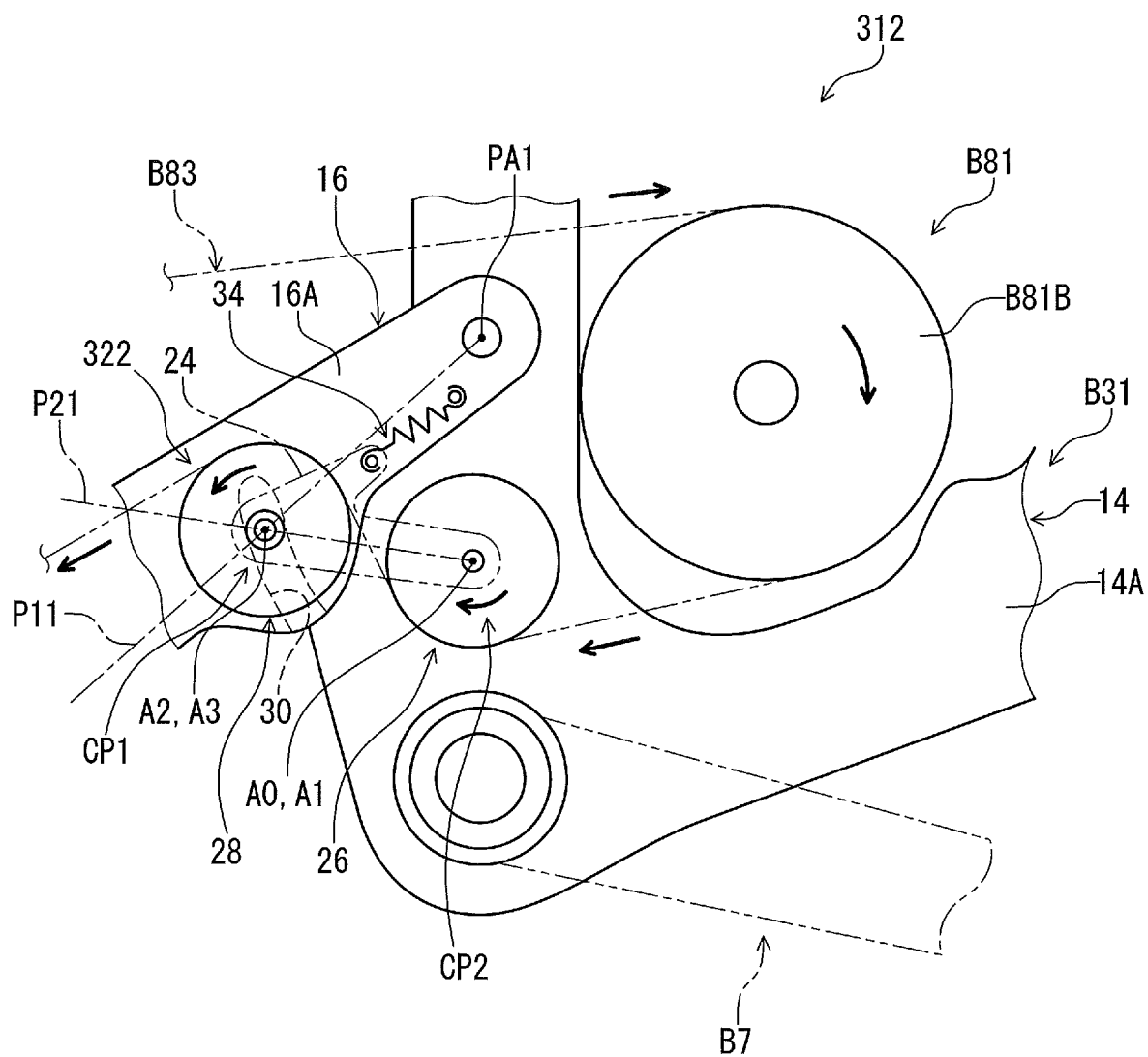
FIG. 31 is a schematic side elevational view of a bicycle provided with a bicycle tensioner apparatus in accordance with a second embodiment (a higher position).

As seen in FIG. 31, in the bicycle tensioner 322 of the bicycle tensioner apparatus 312, the arrangement of the first coupling portion CP1 and the second coupling portion CP2 is different from the arrangement thereof described in the first embodiment. The arrangement of the first guide member 26 and the second guide member 28 is different from the arrangement thereof described in the first embodiment.

In this embodiment, the first coupling portion CP1 is configured to be movably coupled to the second base member 16. The second coupling portion CP2 is configured to be coupled to the first base member 14. The second base member 16 includes the guide surface 30, and the tensioner 322 includes the guide follower 32. The second base member 16 includes the guide groove 36. However, the second base member 16 can include the guide follower 32, and the tensioner 322 can include the guide surface 30 (the guide groove 36).

With the bicycle tensioner apparatus 312, it is possible to obtain substantially the same effects as those of the bicycle tensioner apparatus 12 in accordance with the first embodiment.

It will be apparent to those skilled in the bicycle field from the present disclosure that the constructions of the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle tensioner apparatus comprising:
a first base member;
a second base member movably coupled to the first base member, a tensioner configured to contact a driving-force transmitting member to apply tension to the driving-force transmitting member, the tensioner being coupled to both the first base member and the second base member, the tensioner being movable relative to at least one of the first base member and the second base member in response to a relative movement between the first base member and the second base member.

2. The bicycle tensioner apparatus according to claim 1, wherein
one of the first base member and the second base member includes one of a guide surface and a guide follower,
the tensioner includes the other of the guide surface and the guide follower, and
the guide follower is disposed on the guide surface to move the tensioner relative to the one of the first base member and the second base member in response to the relative movement between the first base member and the second base member.

3. The bicycle tensioner apparatus according to claim 2, wherein
the tensioner includes
a support member pivotally coupled to the second base member about a support pivot axis, and
a first guide member mounted to the support member to guide the driving-force transmitting member.

4. The bicycle tensioner apparatus according to claim 3, wherein
the tensioner includes a second guide member mounted to the support member to guide the driving-force transmitting member.

5. The bicycle tensioner apparatus according to claim 3, wherein
the first guide member includes a first pulley rotatably coupled to the support member about a first rotational axis.

6. The bicycle tensioner apparatus according to claim 5, wherein
the tensioner includes a second guide member mounted to the support member to guide the driving-force transmitting member, and
the second guide member includes a second pulley rotatably coupled to the support member about a second rotational axis.

7. The bicycle tensioner apparatus according to claim 6, wherein
the support pivot axis coincides with the second rotational axis.

8. The bicycle tensioner apparatus according to claim 5, wherein
the tensioner includes a coupling member coupling the first pulley and the guide follower to the support member together.

9. The bicycle tensioner apparatus according to claim 3, wherein
one of the guide surface and the guide follower is provided at the support member.

10. The bicycle tensioner apparatus according to claim 3, wherein
the tensioner includes a biasing member to apply a biasing force to the support member to pivot the support member about the support pivot axis.

11. The bicycle tensioner apparatus according to claim 3, wherein
the guide follower is disposed on the support member and spaced apart from the support pivot axis.

12. The bicycle tensioner apparatus according to claim 2, wherein
the guide follower is in contact with the guide surface.

13. The bicycle tensioner apparatus according to claim 2, wherein
the one of the first base member and the second base member includes a guide groove,
the guide surface at least partly define the guide groove, and
the guide follower is disposed in the guide groove.

14. The bicycle tensioner apparatus according to claim 2, wherein
the guide surface includes a curved surface.

15. The bicycle tensioner apparatus according to claim 1, wherein
the second base member is movable relative to the first base member between a first base position and a second base position,
the tensioner is pivotable relative to the second base member about the support pivot axis between a first pivot position and a second pivot position, and
the guide follower is disposed on the guide surface to move the tensioner from the first pivot position to the second pivot position in response to a movement of the second base member from the first base position to the second base position.

16. The bicycle tensioner apparatus according to claim 15, wherein
the guide surface includes a first guide part and a second guide part,
the tensioner is positioned at the first pivot position in a state where the guide follower is disposed on the first guide part, and
the tensioner is positioned at the second pivot position in a state where the guide follower is disposed on the second guide part.

17. The bicycle tensioner apparatus according to claim 16, wherein
the second base member is pivotally coupled to the first base member about a base pivot axis, and
a first distance defined between the base pivot axis and the first guide part is different from a second distance defined between the base pivot axis and the second guide part.

18. The bicycle tensioner apparatus according to claim 1, wherein
the second base member is pivotally coupled to the first base member about a base pivot axis.

19. The bicycle tensioner apparatus according to claim 1, wherein
the first base member includes a base frame to support a crank axle, and
the second base member includes a swing arm movably coupled to the base frame.

20. A bicycle tensioner comprising:
a first coupling portion configured to be movably coupled to one of a first base member and a second base member, the first base member and the second base member being members of a bicycle frame;
a second coupling portion configured to be coupled to the other of the first base member and the second base member; and
a first guide member configured to contact a driving-force transmitting member,
the bicycle tensioner being movable relative to at least one of the first base member and the second base member in response to a relative movement between the first base member and the second base member.

21. The bicycle tensioner according to claim 20, wherein the second coupling portion is pivotably coupled to the second base member about a support pivot axis.

22. The bicycle tensioner according to claim 21, wherein the second coupling portion includes a pivot axle, and the first coupling portion includes one of a projection and a recess.

23. The bicycle tensioner according to claim 21, further comprising
a support member to support the first coupling portion, the second coupling portion, and the first guide member.

24. The bicycle tensioner according to claim 23, further comprising
a second guide member mounted to the support member to guide the driving-force transmitting member.

25. The bicycle tensioner according to claim 23, wherein the first guide member includes a first pulley rotatably coupled to the support member about a first rotational axis.

26. The bicycle tensioner according to claim 25, wherein the second guide member includes a second pulley rotatably coupled to the support member about a second rotational axis.

27. The bicycle tensioner according to claim 26, further comprising
a coupling member, wherein
the first coupling portion includes a projection, and
the coupling member couples the first pulley and the projection to the support member together.

28. The bicycle tensioner according to claim 27, wherein the projection includes a roller rotatable relative to the support member about a rotational axis defined along the first rotational axis.

29. The bicycle tensioner according to claim 28, wherein the rotational axis of the roller coincides with the first rotational axis.

30. The bicycle tensioner according to claim 28, wherein the first coupling portion is configured to be movable relative to the one of the first base member and the second base member in response to a relative movement between the first base member and the second base member.

31. The bicycle tensioner according to claim 23, further comprising
a biasing member to apply a biasing force to the support member to pivot the support member about the support pivot axis.

32. The bicycle tensioner according to claim 20, wherein the first base member and the second base member are configured to support weight of a rider sitting on a saddle provided on the bicycle frame.

33. A bicycle tensioner comprising:
a first coupling portion configured to be movably coupled to one of a first base member and a second base member;
a second coupling portion configured to be coupled to the other of the first base member and the second base member;
a first guide member configured to contact a driving-force transmitting member; and
a support member to support the first coupling portion, the second coupling portion, and the first guide member, wherein
the second coupling portion is pivotably coupled to the second base member about a support pivot axis,
the first guide member includes a first pulley rotatably coupled to the support member about a first rotational axis,
the second guide member includes a second pulley rotatably coupled to the support member about a second rotational axis, and
the support pivot axis coincides with the second rotational axis.

* * * * *